US012438271B2

(12) United States Patent
Taravati et al.

(10) Patent No.: US 12,438,271 B2

(45) Date of Patent: Oct. 7, 2025

(54) NONRECIPROCAL BEAM STEERABLE METASURFACES

(71) Applicant: Latys Intelligence Inc., Montreal (CA)

(72) Inventors: Sajjad Taravati, Toronto (CA); George V. Eleftheriades, Scarborough (CA)

(73) Assignee: Latys Intelligence Inc., Montreal (CA)

(*) Notice: Subject to any disclaimer, the term of this patent is extended or adjusted under 35 U.S.C. 154(b) by 146 days.

(21) Appl. No.: 18/035,826

(22) PCT Filed: Nov. 9, 2020

(86) PCT No.: PCT/CA2020/051514

§ 371 (c)(1),
(2) Date: May 8, 2023

(87) PCT Pub. No.: WO2022/094686

PCT Pub. Date: May 12, 2022

(65) Prior Publication Data

US 2023/0411844 A1 Dec. 21, 2023

(51) Int. Cl.

*H01Q 15/00* (2006.01)
*H01Q 3/46* (2006.01)

(52) U.S. Cl.

CPC .................................... *H01Q 3/46* (2013.01)

(58) Field of Classification Search

CPC ...... H01Q 3/46; H01Q 9/045; H01Q 15/0086; H01Q 15/148

See application file for complete search history.

(56) References Cited

U.S. PATENT DOCUMENTS

| | | | | |
|---|---|---|---|---|
| 9,958,707 B2 * | 5/2018 | Atwater | ................ | G02F 1/0121 |
| 10,720,712 B2 * | 7/2020 | Foo | .......................... | H01Q 1/36 |
| 10,775,648 B2 * | 9/2020 | Atwater | ................ | G02F 1/0018 |
| 11,183,769 B2 * | 11/2021 | Green | ..................... | H01Q 15/18 |
| 12,132,253 B2 * | 10/2024 | Green | .................. | H01Q 3/2647 |

(Continued)

FOREIGN PATENT DOCUMENTS

| | | |
|---|---|---|
| JP | 2019530387 A | 10/2019 |
| WO | 2015187221 A2 | 12/2015 |
| WO | 2019082164 A1 | 5/2019 |

OTHER PUBLICATIONS

Japanese Office Action (including English translation) issued in App. No. JP2023-550335, dated Oct. 1, 2024, 12 pages.

(Continued)

*Primary Examiner* — Awat M Salih

(74) *Attorney, Agent, or Firm* — Blueshift IP; Robert Plotkin

(57) ABSTRACT

This invention presents a full-duplex nonreciprocal-beam-steering transmissive phase-gradient metasurface. The metasurface comprises a conductor layer interposed between two dielectric layers. Each of the dielectric layers comprises a plurality of meta-atoms embedded therein. Each of the meta-atoms comprises phase shifters and antenna elements. The meta-surface functions such that when an electromagnetic wave is received at the surface of the metasurface, the metasurface transmits a wave having an identical frequency to the frequency of the received wave but to a different direction in space.

18 Claims, 27 Drawing Sheets

(56) References Cited

U.S. PATENT DOCUMENTS

| | | | | |
|---|---|---|---|---|
| 2021/0091463 | A1* | 3/2021 | Shahvirdi Dizaj Yekan | H01Q 3/36 |
| 2022/0021125 | A1* | 1/2022 | Baligh | H01Q 21/06 |

OTHER PUBLICATIONS

Sajjad Taravati et al., Full-Duplex Nonreciprocal-Beam-Steering Metasurfaces Comprising Time-Modulated Twin Meta-Atoms, Nov. 11, 2019.

J.A. Hodge et al., "Reflective Beam Steering of Metasurface Using Circular Inter-Digitated Self-Phased Pixels/Cells," 2020 XXXIIIrd General Assembly and Scientific Symposium of the International Union of Radio Science, Aug. 29, 2020, ISSN (Electronic) 2642-4339 [online][retrieved on Jan. 26, 2021]. Retrieved from the Internet: https://doi.org/10.23919.URSIGASS49373.2020.9232014.

International Search Report and Written Opinion mailed Jan. 29, 2021, in international application No. PCT/CA2020/051514, 10 pages.

* cited by examiner

NONRECIPROCAL BEAM STEERABLE METASURFACES

TECHNICAL FIELD

The following relates to the field of metasurfaces for wave engineering and electromagnetic wave radiation control. Specifically, this invention relates to method for controlling and tailoring of electromagnetic waves for full-duplex beam steering.

BACKGROUND

The ever increasing progress in wireless telecommunication systems demands improvements in the fields of wave engineering and radiation control.

Nonreciprocal radiation refers to electromagnetic wave radiation in which the transmission beam varies from the reception beam. Typically, ferrite-based materials have been used for nonreciprocity implementation. However, the ferrite-based materials are heavy, costly and are not compatible with printed circuit board technology. In addition, they are not suitable for high frequencies, i.e., for 5G, 6G and future generation telecommunication applications.

It is an object of the following to overcome at least some of the above-noted disadvantages.

SUMMARY

In one embodiment, a metasurface is provided. The metasurface comprises a conductor layer interposed between two dielectric layers. Each of the dielectric layers comprises a meta-atom embedded therein. Each of the meta-atoms comprises phase shifters and antenna elements such that when an electromagnetic wave is received at the surface of the metasurface, the metasurface transmits a wave having an identical frequency to the frequency of the received wave but towards a different direction in space.

In another embodiment, a metasurface system is provided. The metasurface system comprises a conductor layer interposed between two dielectric layers. Each of the dielectric layers comprises a plurality of meta-atoms embedded therein. Each meta-atom in the plurality of meta-atoms comprises a surrounding circuit. The surrounding circuit may be composed of at least one microstrip patch radiator in electrical connection with at least one transmission-line-based interconnector in electrical connection with at least one varactor, inductor and/or capacitor.

In yet another embodiment, a method of beam steering using a metasurface is provided. The method comprises biasing a meta-atom with a time-varying modulation signal; the modulation signal undergoing at least one set of gradient phase shifts; the modulation signal then biasing at least one varactor to create a non-reciprocal phase shift.

BRIEF DESCRIPTION OF THE DRAWINGS

Embodiments will now be described with reference to the appended drawings wherein.

DETAILED DESCRIPTION

This invention presents a full-duplex nonreciprocal-beam-steering transmissive phase-gradient metasurface. The metasurface may be placed on top of a source antenna to transform the radiation pattern of the source antenna and introduce different radiation patterns for the transmit and receive states. The metasurface is endowed with directive, diverse and asymmetric transmission and reception radiation beams, and tunable beam shapes. Furthermore, these beams can be steered by changing the modulation phase. All undesired time harmonics are suppressed in each unit-cell, leading to a high conversion efficiency which is of paramount importance for practical applications such as point to point full-duplex communications.

Figure 1:
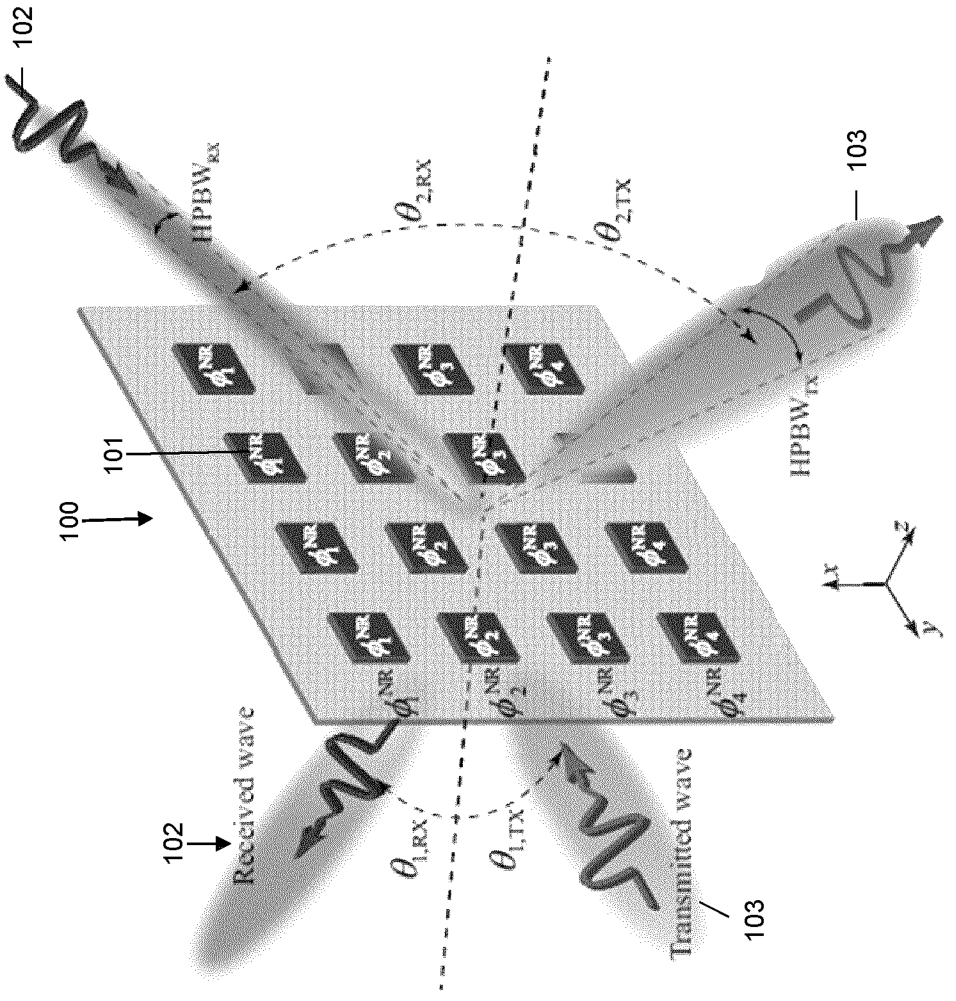
FIG. 1 provides a schematic representation of the metasurface system formed by an array of gradient nonreciprocal phase shift meta-atoms.

Turning now to the figures, FIG. 1 depicts the structure of the metasurface 100. The metasurface 100 is generally composed of an array of time-modulated meta-atoms 101. The meta-atoms 101 carry out operations such as wave reception, non-reciprocal phase shift for nonreciprocal beam steering, filtering out of unwanted temporal harmonics, and wave radiation. The structure of the metasurface 100 achieves transmissive reception and re-radiation of the electromagnetic waves, as well as filtering of undesired temporal harmonics. Twin time-modulated meta-atoms 101 inherently prohibit the excitation of undesired time harmonics, leading to a high conversion efficiency which is of paramount importance for practical applications such as for instance point to point full-duplex telecommunications. In one instance, a received radiation beam (RX) 102 is input into an array of meta-atoms 101. The meta-atoms 101 can steer the radiation beam 102 by changing the modulation phase, yet the frequency of the transmitted beam 103 will remain the same as the frequency of the received beam 102. It can be appreciated that any angle of transmission or reception is possible and controllable as needed.

Figure 2:
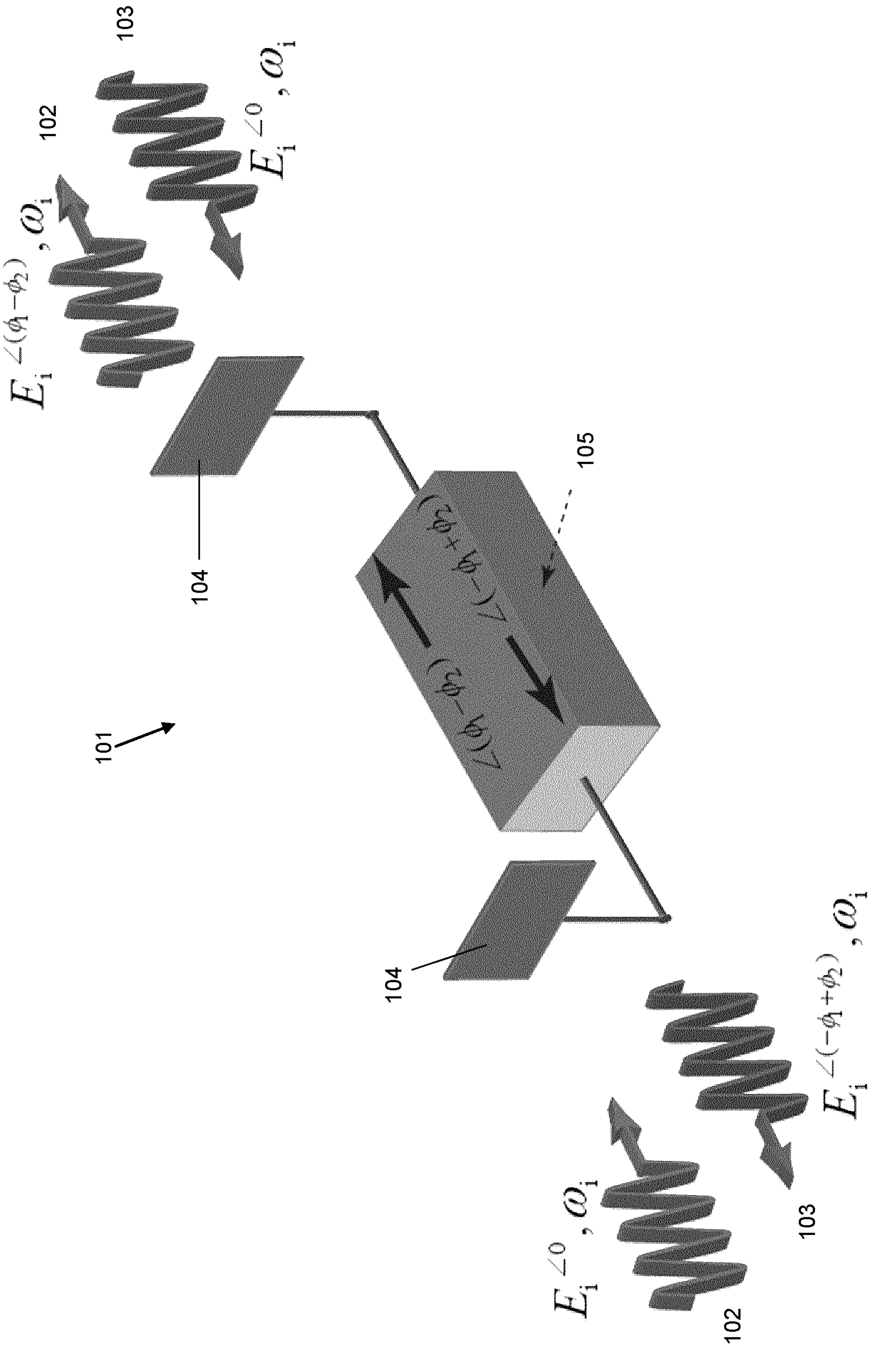
FIG. 2 provides a schematic representation of the transmissive nonreciprocal phase shift meta-atoms.

FIG. 2 provides a schematic view of a unit-cell meta-atom 101. Specifically, FIG. 2 provides a transmissive nonreciprocal phase shifting radiating meta-atom. It is constructed by using two antenna elements interconnected through a phase shifter 105. The meta-atoms 101 comprise two antenna elements 104. The antenna elements 104 receive and transmit the electromagnetic waves 102, 103. The antenna element can include patch radiator, or other suitable antennas. The meta-atoms 101 also comprise a phase shifter 105. The phase shifter 105 is preferably a tunable, non-reciprocal phase shifter. The meta-atoms 101 may be considered twin time-modulated meta-atoms as they may take advantage of the nonreciprocal phase shift in a round-trip photonic transition in a time-modulated meta-atom, achieving no frequency alteration. Therefore, the frequency of the forward incident wave 102 is the same as the frequency of the backward transmitted wave 103.

Figure 3:
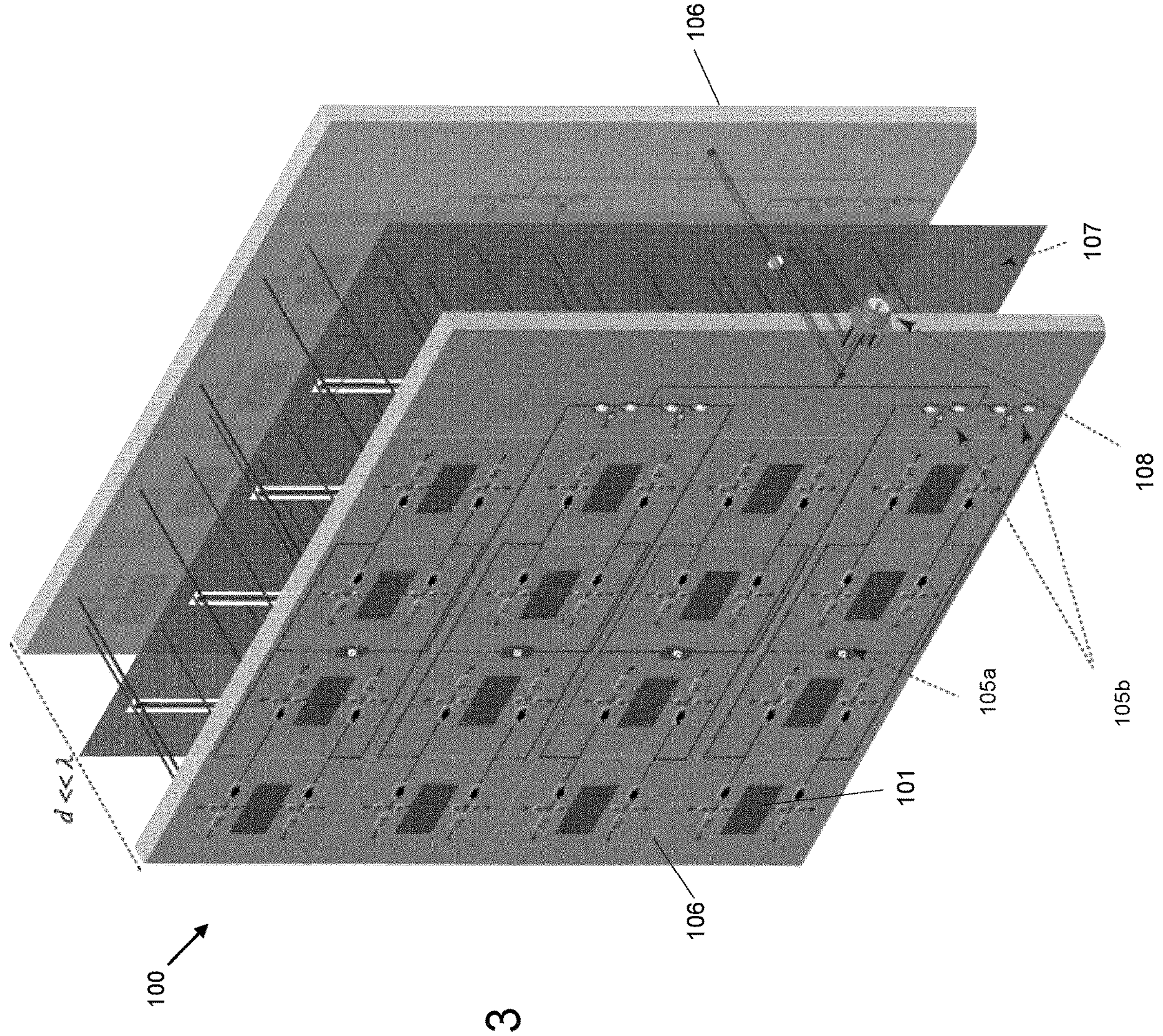
FIG. 3 provides an exploded view of the metasurface system formed by nonreciprocal phase shift meta-atoms.

FIG. 3 depicts a schematic of the complete phase-gradient metasurface 100 comprising 4×4 twin time-modulated meta-atoms 101. The embodiments provided FIG. 3 depict a 4×4 array of meta-atoms however, any size array is possible such as: 1×2; 2×1, 3×2, 5×10, A×B; or A×A, where A and B are any positive integers. The metasurface 100 comprises a conductor layer 107 interposed between two dielectric layers 106. Each of the dielectric layers 106 comprises a plurality of meta-atoms 101 embedded therein. Each of the meta-atoms 101 comprises phase shifters 105, and antenna elements 104. The phase-shifters 105 may be any suitable phase-shifters such as nonreciprocal, 180° phase shifters 105*a* or gradient phase shifters 105*b*. The metasurface may additionally comprise modulation input element 108.

Figure 4:
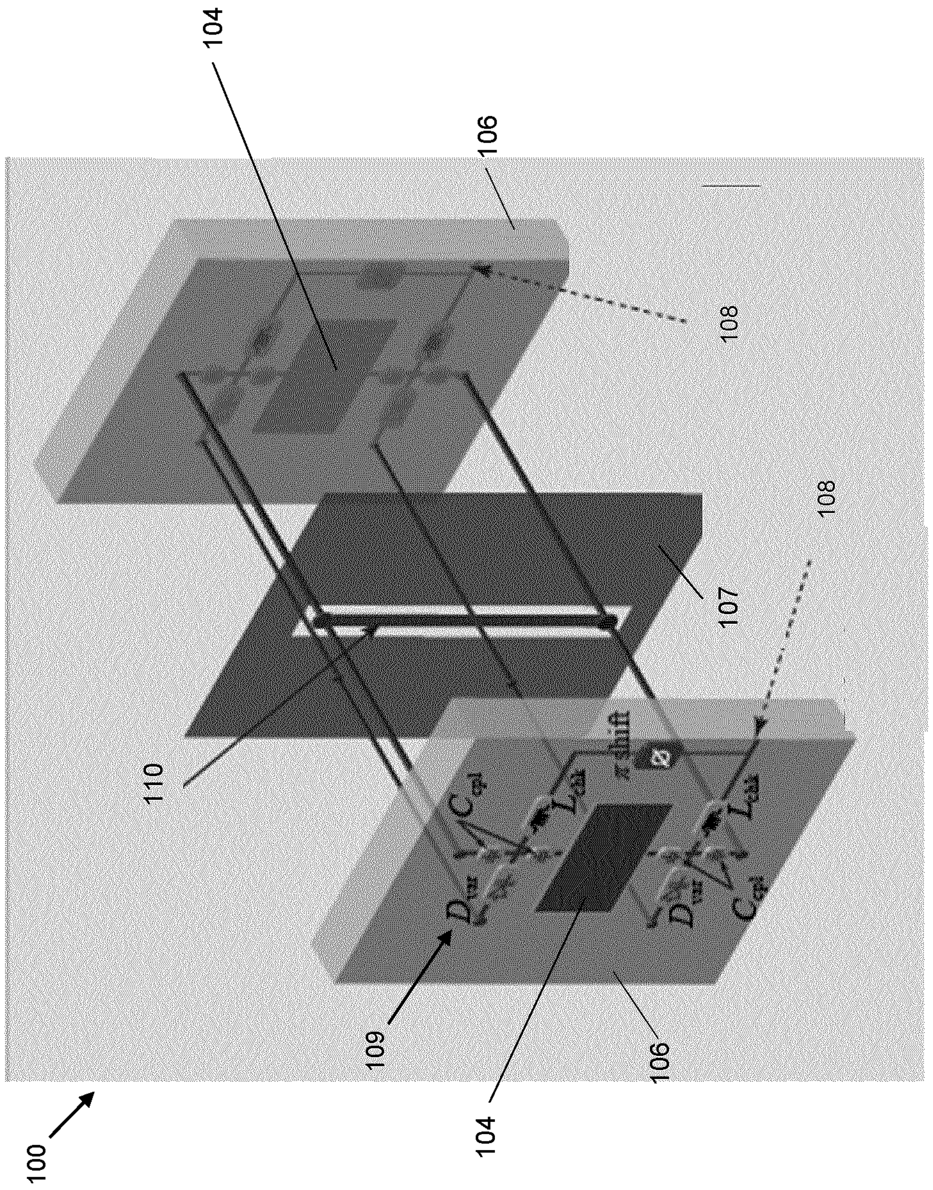
FIG. 4 provides an expanded view of the metasurface shown in FIG. 3.

FIG. 4 provides an expanded view of a single unit-cell meta-atom 101 shown in FIG. 3. Each meta-atom 101 in the array may comprise a surrounding circuit 109 having circuit elements which enhance the performance of the metasurface 100. The metasurface 100 is a multi-layer structure. A conductor layer 107 separates the two dielectric layers 106 from each other. Each of the dielectric layers 106 comprises a plurality of meta-atoms 101 embedded therein. The meta-atoms 101 including the phase shifter 105 and the antenna elements 104 are embedded in the dielectric layers 106. The surrounding circuit 109 may be composed of at least one microstrip patch radiator in electrical connection with at least one transmission-line-based interconnector in electrical connection with at least one varactor, inductor and/or capacitor. It can be understood that the circuit elements may be varied, changed, or altered to enhance or optimize the functionality of the metasurface.

The conductor layer may optionally comprise a via or, interconnection 110. The interconnection 110 is for destructive interference at a first frequency.

Figure 5:
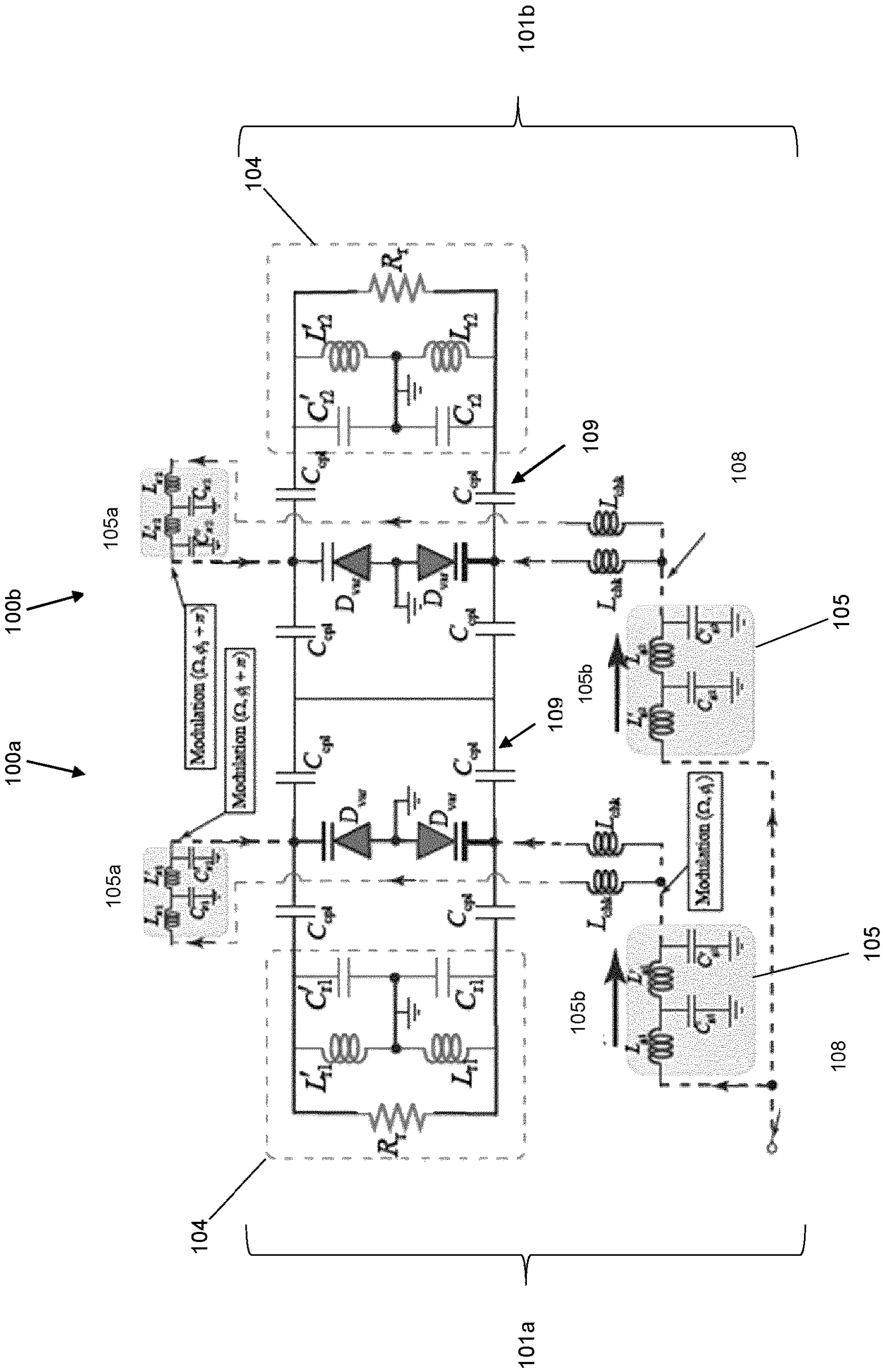
FIG. 5 provides a circuit model of the nonreciprocal phase shift meta-atoms.

FIG. 5 provides an equivalent circuit model showing the circuit of a first meta-atom 101*a* in a first meta-surface 100*a* connected to a second meta-atom 101*b* in a second, opposite metasurface 100*b*. In this embodiment, the meta-atoms 101 are composed of two microstrip patch radiators 104, one transmission-line-based interconnector, four varactors, four inductors, eight capacitors, and a metal sheet separating the two meta-atoms from each other.

The equivalent circuit model of the patch radiators 104 may consist of an RCL circuit having two inductors in parallel with two capacitors and one resistor. It can be noted that any suitable antenna element 104 is possible. In addition to the two patch radiators, the surrounding circuit 109, for example, may include two 180° phase shifters, two phase shifters with phases $\phi_1$ and $\phi_2$, respectively, the four varactor diodes $D_{var}$, four choke inductors $L_{chk}$, and eight decoupling capacitances $C_{cp1}$. The inductances $L_{chk}$ and capacitances $C_{cp1}$ efficiently prevent the leakage of the incident wave to the modulation path and decouple the two modulation signals (with 180° phase difference) at the upper and lower side of the unit cell.

FIG. 5 demonstrates the equivalent circuit of the unit cell. The unit cell is biased with a modulation signal (Ω), that is received at the first meta-atom. The modulation signal may be used to control the angle of transmission. The modulation signal undergoes a phase shift of $\phi_1$ for the first gradient phase shifter, whereas it undergoes a phase shift of $\phi_2$ for the second gradient phase shifter. The modulation signal then biases varactors $D_{var}$, creating the desired non-reciprocal phase shift. The incident beam is received at the antenna elements 104*a*, it then undergoes a phase shift and is radiated to the opposite side of the metasurface, 100*b*. Similarly, if the incident beam is received at the antenna elements 104*b*, it will undergo a phase shift and be radiated to the opposite side of the metasurface, 100*a*. The non-reciprocal phase shifter 105, such as the gradient phase shifters $\phi_1$ or $\phi_2$ will treat an incident wave differently depending on which side of the meta-surface it is received from. Beam steering is accomplished by using non-reciprocal, tunable phase shifter.

It is pertinent that the frequency of the transmitted beam be equal to the frequency of the incident beam. If the frequencies of the incident and transmitted beam are different, then there may be undesired effects such as complications at the receiver, or channel interference.

Figure 6:
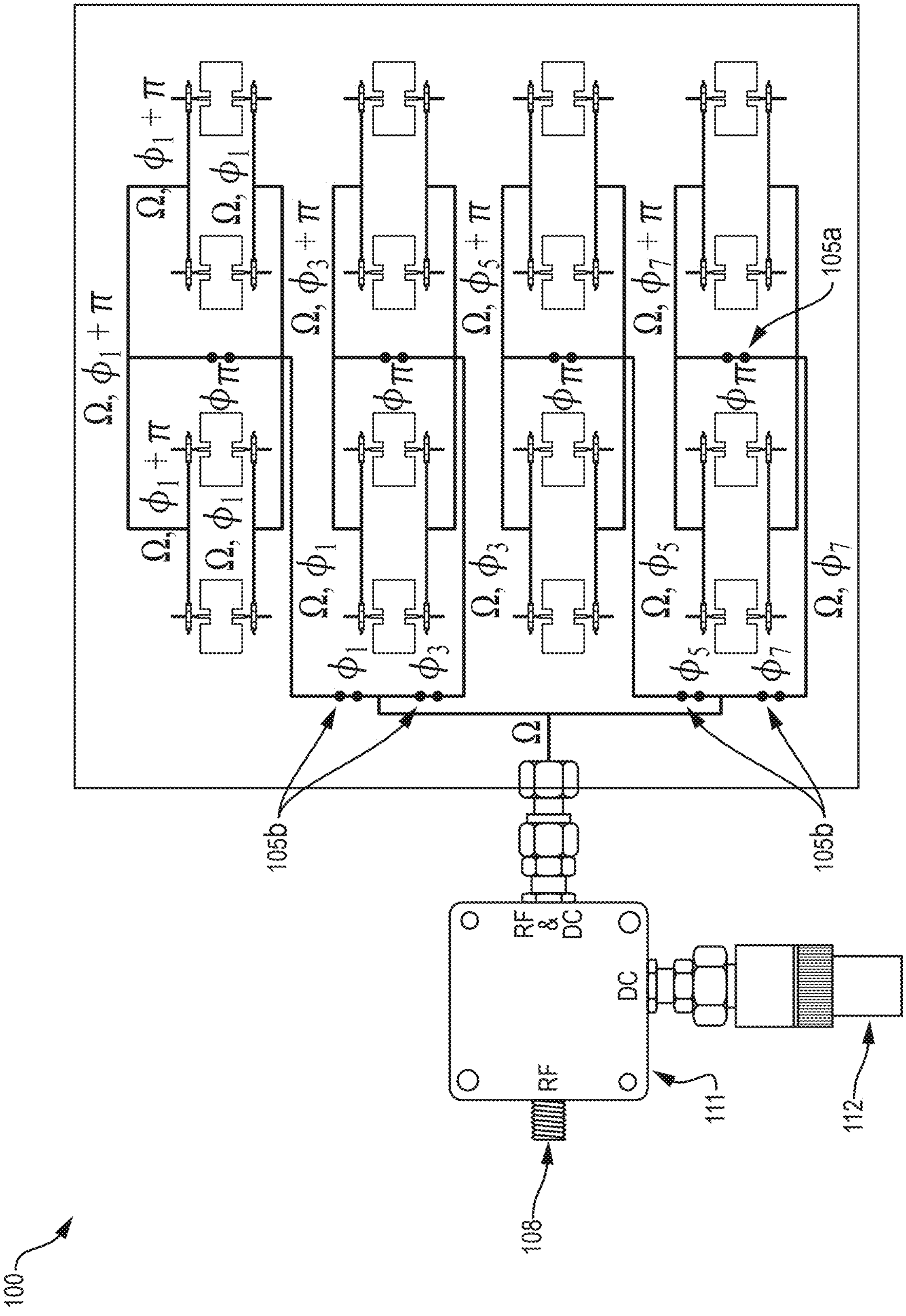
FIG. 6 provides a photograph of the metasurface and connecting circuit.
Figure 7:
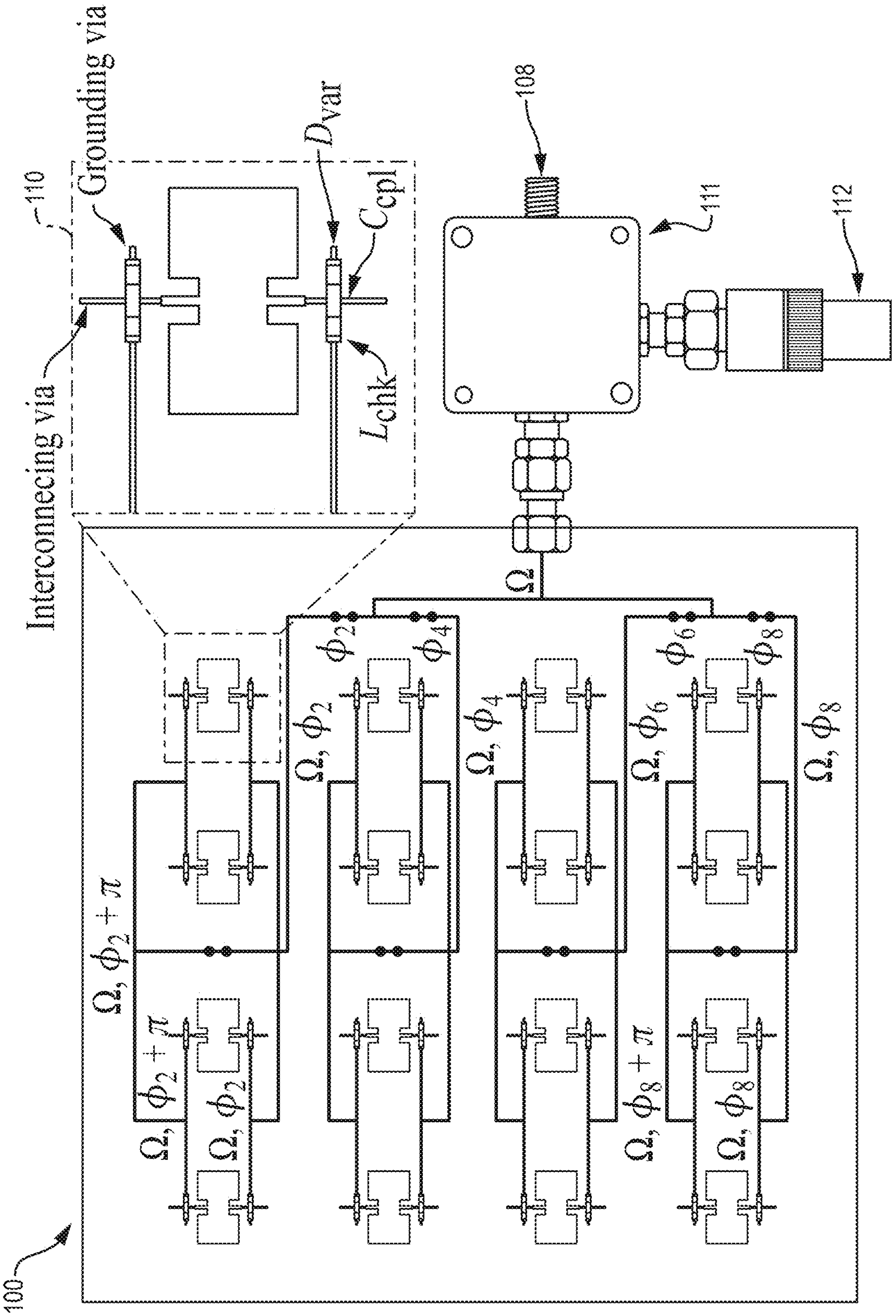
FIG. 7 provides another photograph of the metasurface and connecting circuit.

FIG. 6 provides a photograph of the metasurface 100 and connecting circuit. The modulation signal Ω is fed to the metasurface via a RF coaxial connector such as a SubMiniature version A (SMA) connector. In this embodiment, the metasurface includes eight gradient phase shifters, four phase shifters in each side, providing the required modulation phase shifts for nonreciprocal beam steering. In addition, eight 180° phase shifters (π) are utilized for achieving the phase-shifted version of each gradient phase shifted modulation signal. FIG. 6 shows the top view of the fabricated prototype, and FIG. 7 shows the bottom view. A DC signal is applied to the varactors to achieve the desired average capacitance (average permittivity). A bias-tee 111 is used to separate the DC bias and the modulation signal 108.

The connecting circuit may also include a bias tee 111. Bias tees are components that are used to supply DC currents or voltages to bias RF circuits. A bias tee 111 is a three-port device. In this embodiment, the RF modulation signal is incident at port 1 of the bias tee 111. A DC bias 112 is applied to port 3 of the bias tee 111. A modulation signal 108 consists of RF+DC signals is passed through the bias tee 111 into the metasurface 100.

In one embodiment, a total number of 64 SMV1247-079LF varactors ($D_{var}$), 64 inductors of $L_{chk}$=20 nH, and 128 decoupling capacitances of $C_{cp1}$=5 pF are used. The metasurface is fabricated as a three-layer circuit, i.e., one conductor layer and two dielectric layers, made of Rogers RO3210 with 50 mils height (d=100 mils).

Figure 8:
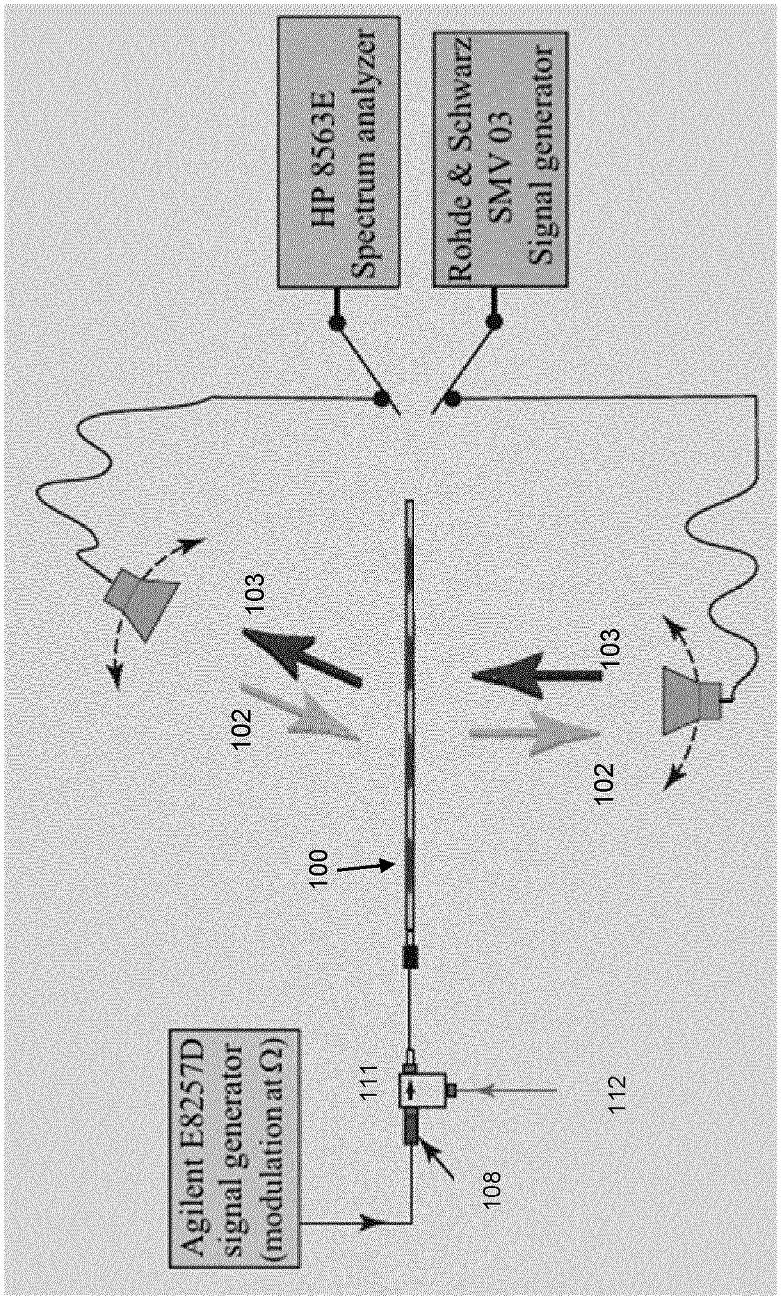
FIG. 8 provides a schematic representation of an experimental set-up of the nonreciprocal radiation beam metasurface.
Figure 9:
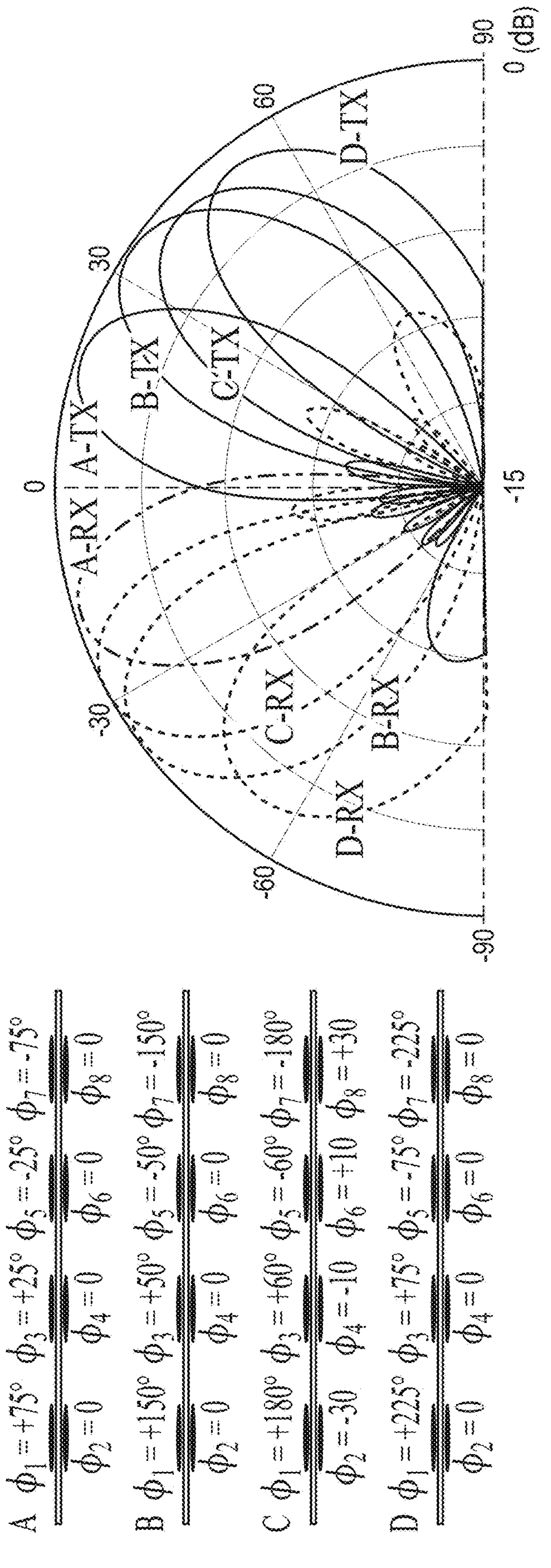
FIG. 9 provides the full-wave simulation results demonstrating the full-duplex beam steering functionality.

FIG. 8 provides a schematic diagram showing experimental demonstration of nonreciprocal radiation beam metasurface. The measurement set-up consists of two signal generators, a spectrum analyzer and a DC power supply. The results of the experimental demonstration are shown in FIG. 9. FIG. 9 plots the full-wave simulation results demonstrating the full-duplex angle-symmetric/asymmetric beam steering functionality of the time-modulated gradient transmissive metasurface. In this figure, four different gradient profiles are considered, that is, A, B, C and D.

Figure 10:
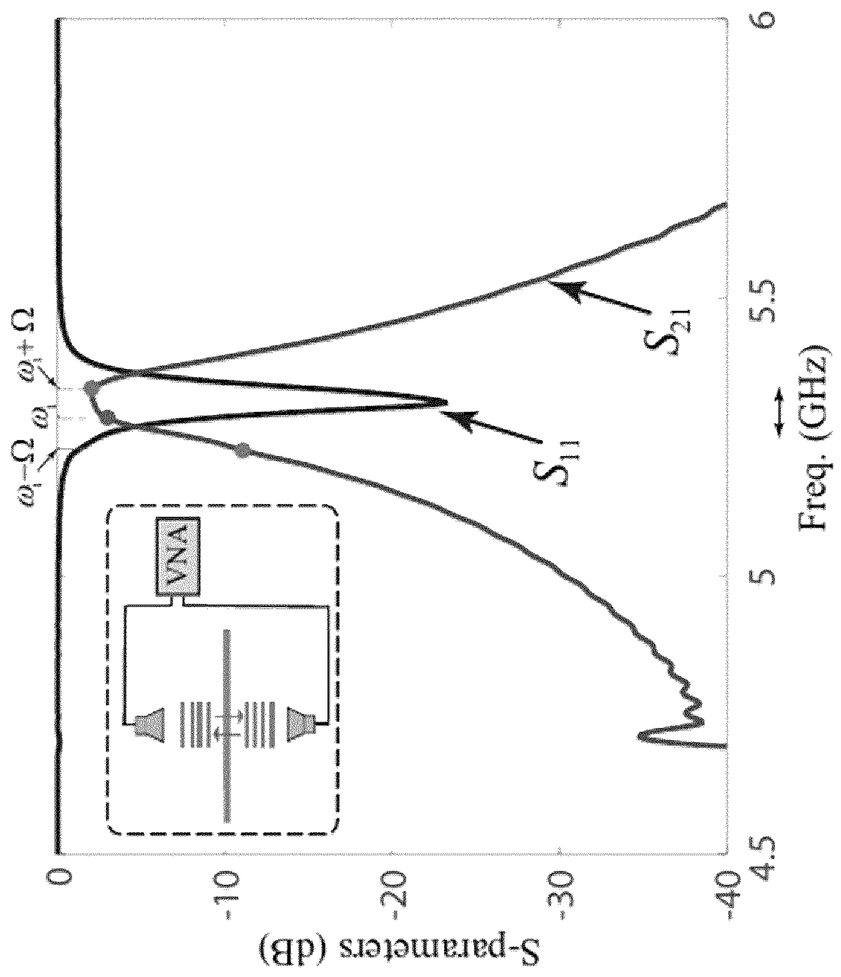
FIG. 10 provides a chart showing the results of the experimental measurement.

FIG. 10 plots the scattering parameters of the fabricated nonreciprocal radiation beam metasurface. This figure highlights three different frequencies, wi−Ω, wi and wi+Ω. Two time harmonics wi and wi+Ω lie inside the passband of the structure, whereas wi−Ω lies in the stop-band of the structure and is being suppressed. The S11 parameter refers to the forward reflection coefficient; the S21 parameter refers to the forward transmission coefficient. FIG. 10 shows that at the modulation frequency, the beam is entirely transmitted none of the beam is reflected. Furthermore, the frequency of the transmitted wave is identical to the frequency of the received wave.

Figure 11:
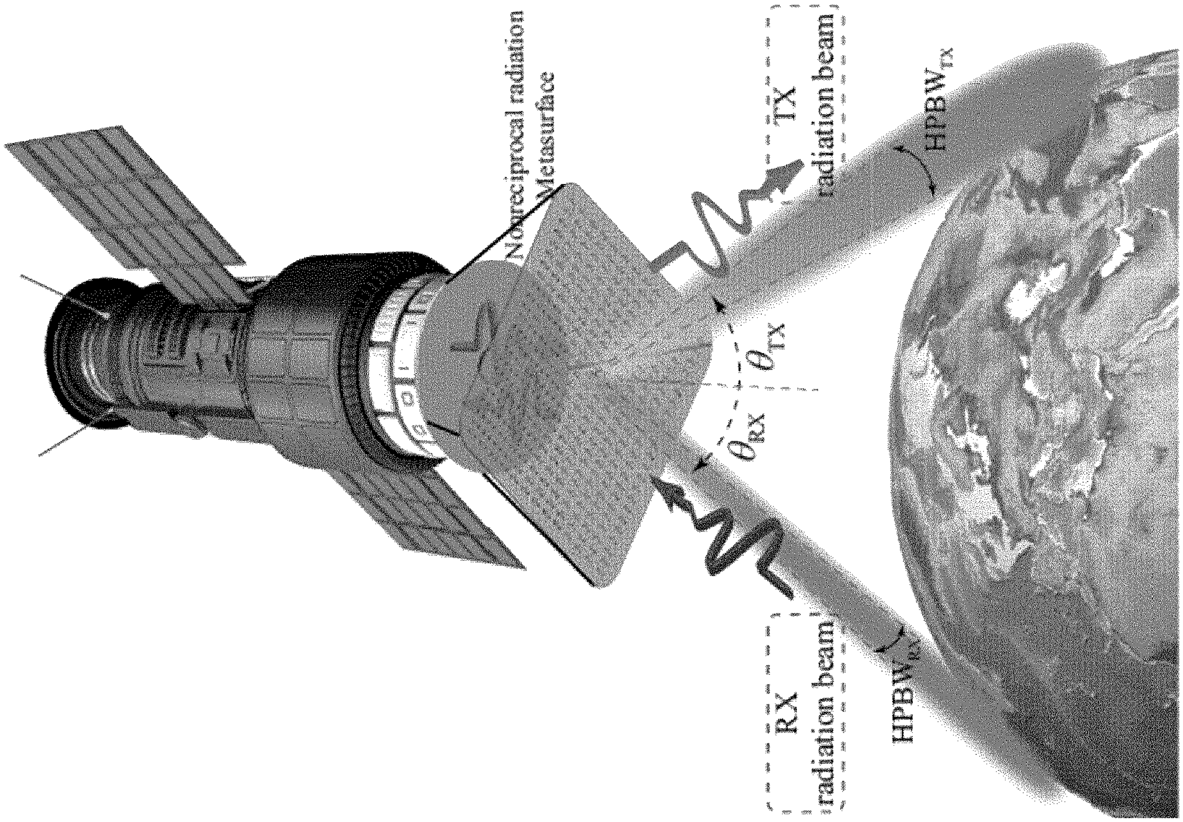
FIG. 11 provides a schematic diagram showing a possible application of the non-reciprocal beam steerable metasurface.

FIG. 11 shows an application of the non-reciprocal beam steering metasurface. For instance, the metasurface may be applied to an antenna such as a satellite antenna such that a received wave in the lower side of the metasurface is transmitted towards the satellite antenna in the upper side of the metasurface without changing the frequency. In the transmission mode, a radiated wave from the satellite antenna on the top of the metasurface is transmitted to the bottom side of the metasurface without changing the frequency, and is reradiated towards the earth. The reception and transmission beams may be steered as needed. This is very practical for applications in the telecommunications fields and can enable 5G, 6G, and future generation telecommunications applications.

The metasurface gives the opportunity to realize full-duplex transmission where simultaneous transmission and reception of waves are performed but at different angles. A mechanism is proposed to achieve nonreciprocal beam operation in the transmission state, such that the structure can be used as a radome for antennas. The incident and transmitted waves share the same frequency. The frequency-phase transitions in time-modulated meta atoms are used to realize a radiating nonreciprocal phase shifter, whereas all the unwanted time harmonics are suppressed.

It should be noted that there is no inherent limit to the bandwidth enhancement of the proposed structure. The frequency bandwidth of the proposed meta-atoms can be enhanced by using engineering approaches for the bandwidth enhancement of microstrip patch elements. In the proposed twin meta-atoms topology, the suppression of unwanted harmonics is not related to the narrow-band operation of the structure. It can be understood that one may use broad-band patch elements and at the same time increase the modulation frequency so that the entire architecture operates in the same way, that is, only two desired time harmonics fall inside the pass-band of the structure and all other undesired harmonics fall inside the stop-band.

Figure 12A:
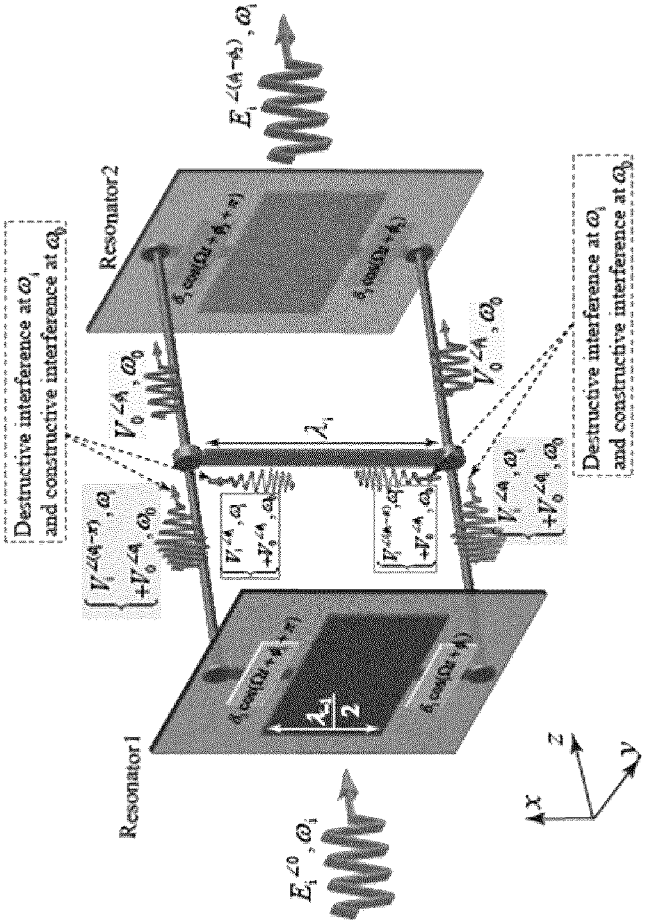
FIG. 12*a* provides the operation of nonreciprocal phase shift meta-atoms in the reception state.
Figure 12B:
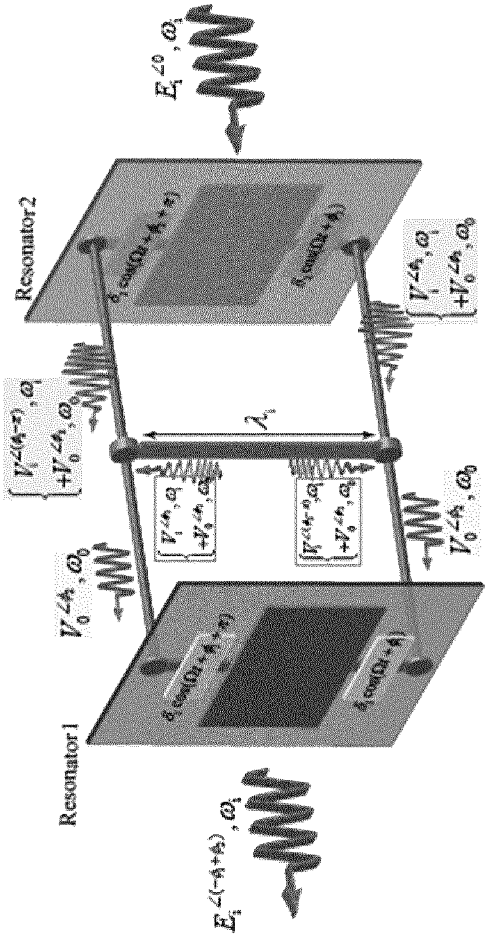
FIG. 12*b* provides the operation of nonreciprocal phase shift meta-atoms in the transmission state.

FIG. 12*a* provides the operation of nonreciprocal phase shift meta-atoms in the reception state. FIG. 12*b* provides the operation of nonreciprocal phase shift meta-atoms in the transmission state.

Figure 13A:
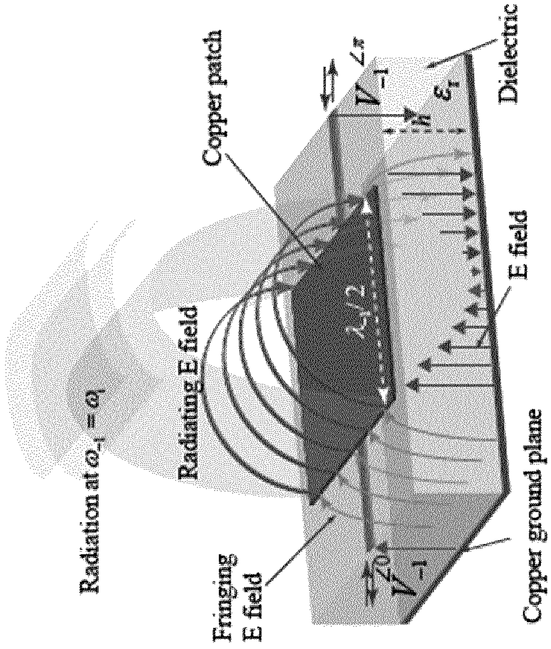
FIG. 13*a* provides the wave radiation by the patch radiator for odd excitation.
Figure 13B:
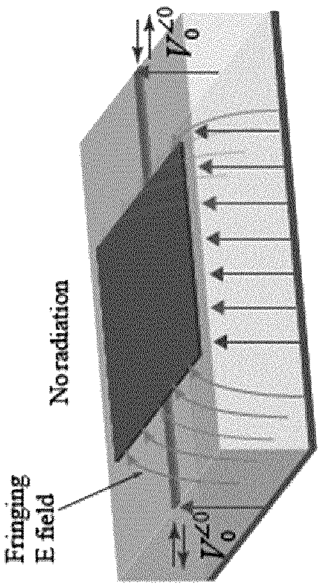
FIG. 13*b* provides the wave transmission by the patch radiator for even excitation.

FIG. 13*a* provides the wave radiation by the patch radiator for odd excitation. FIG. 13*b* provides the wave transmission by the patch radiator for even excitation.

Figure 14A:
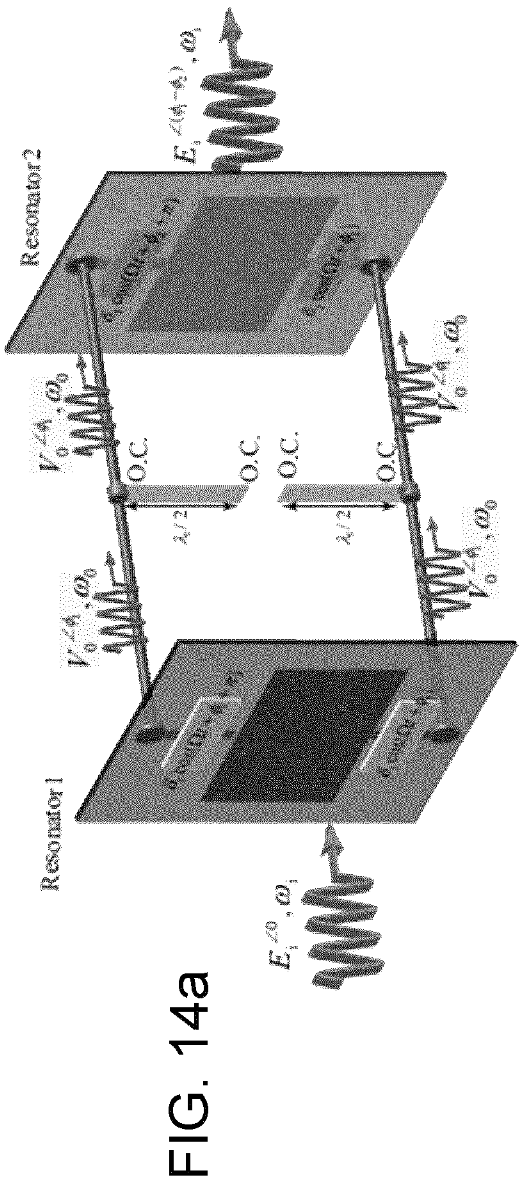
FIG. 14*a* provides schematic representation of propagation of even time harmonics inside the nonreciprocal phase shift meta-atoms.
Figure 14B:
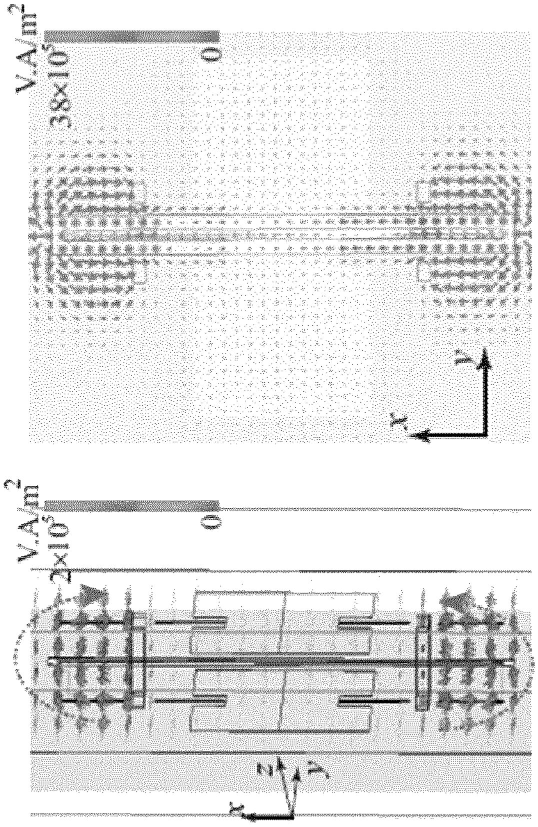
FIG. 14*b* provides full-wave simulation results for propagation of even time harmonics inside the nonreciprocal phase shift meta-atoms.

FIG. 14*a* provides schematic representation of propagation of even time harmonics inside the nonreciprocal phase shift meta-atoms. FIG. 14*b* provides full-wave simulation results for propagation of even time harmonics inside the nonreciprocal phase shift meta-atoms.

Figure 15A:
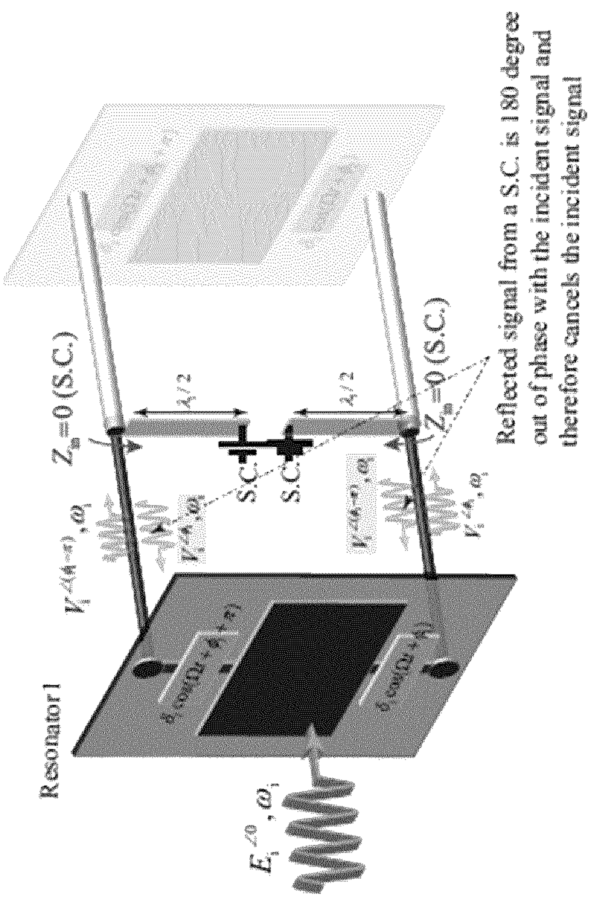
FIG. 15*a* provides schematic representation of propagation of odd time harmonics inside the nonreciprocal phase shift meta-atoms.
Figure 15B:
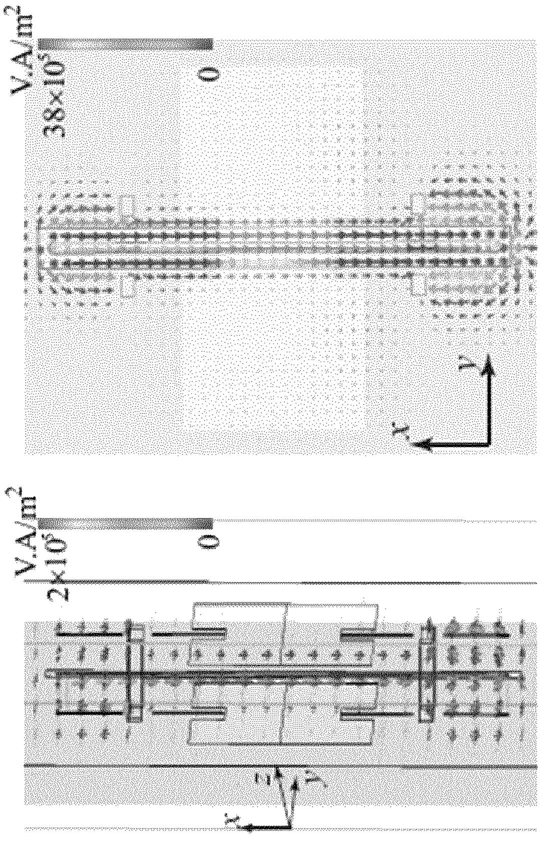
FIG. 15*b* provides full-wave simulation results for propagation of odd time harmonics inside the nonreciprocal phase shift meta-atoms.

FIG. 15*a* provides schematic representation of propagation of odd time harmonics inside the nonreciprocal phase shift meta-atoms. FIG. 15*b* provides full-wave simulation results for propagation of odd time harmonics inside the nonreciprocal phase shift meta-atoms.

Figure 16B:
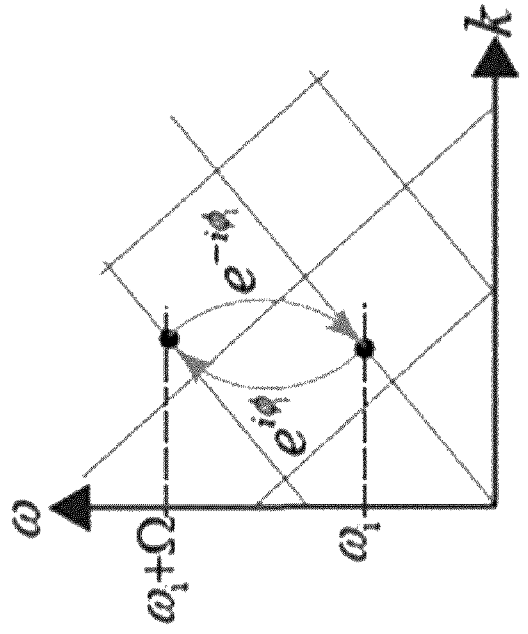
FIG. 16*b* provides schematic representation of the dispersion diagram of a phased time-modulated meta-atom.
Figure 16A:
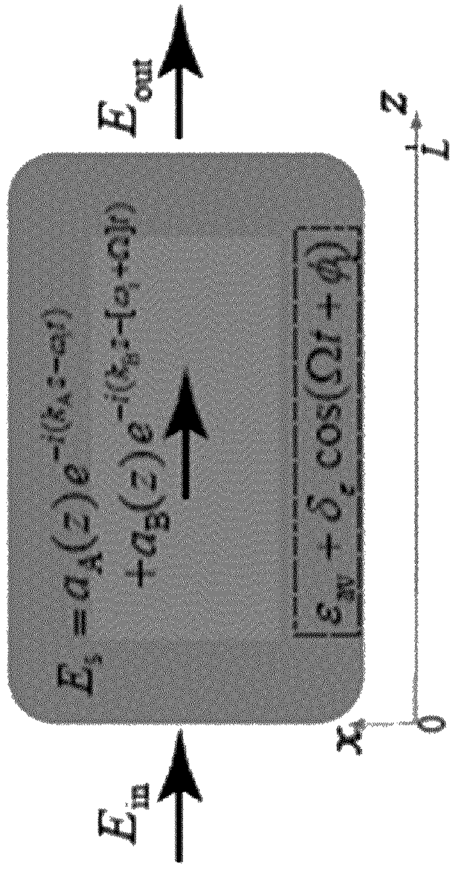
FIG. 16*a* provides nonreciprocal phase shift in a phased time-modulated meta-atom.

FIG. 16*a* provides nonreciprocal phase shift in a phased time-modulated meta-atom. FIG. 16*b* provides schematic representation of the dispersion diagram of a phased time-modulated meta-atom.

Figure 17:
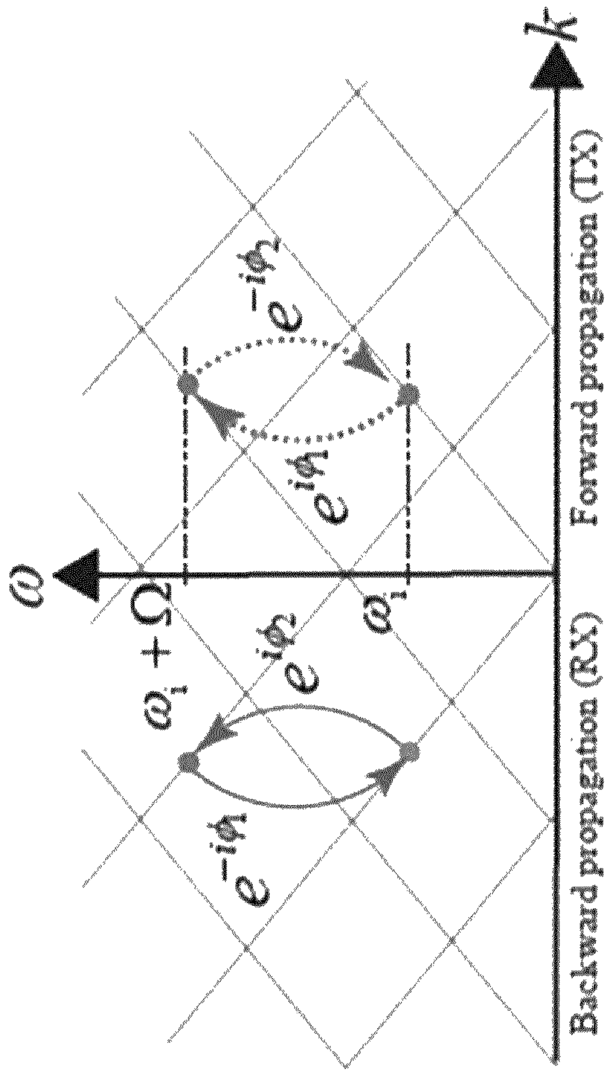
FIG. 17 provides schematic representation of the dispersion diagram of a nonreciprocal phase shift meta-atoms.

FIG. 17 provides schematic representation of the dispersion diagram of a nonreciprocal phase shift meta-atoms.

Figure 18:
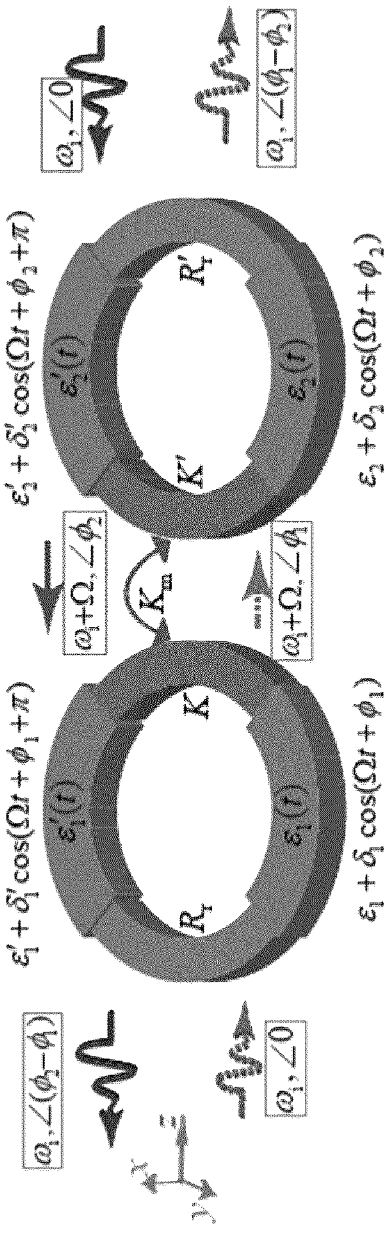
FIG. 18 provides operation principle of the nonreciprocal phase shift meta-atoms.
Figure 19:
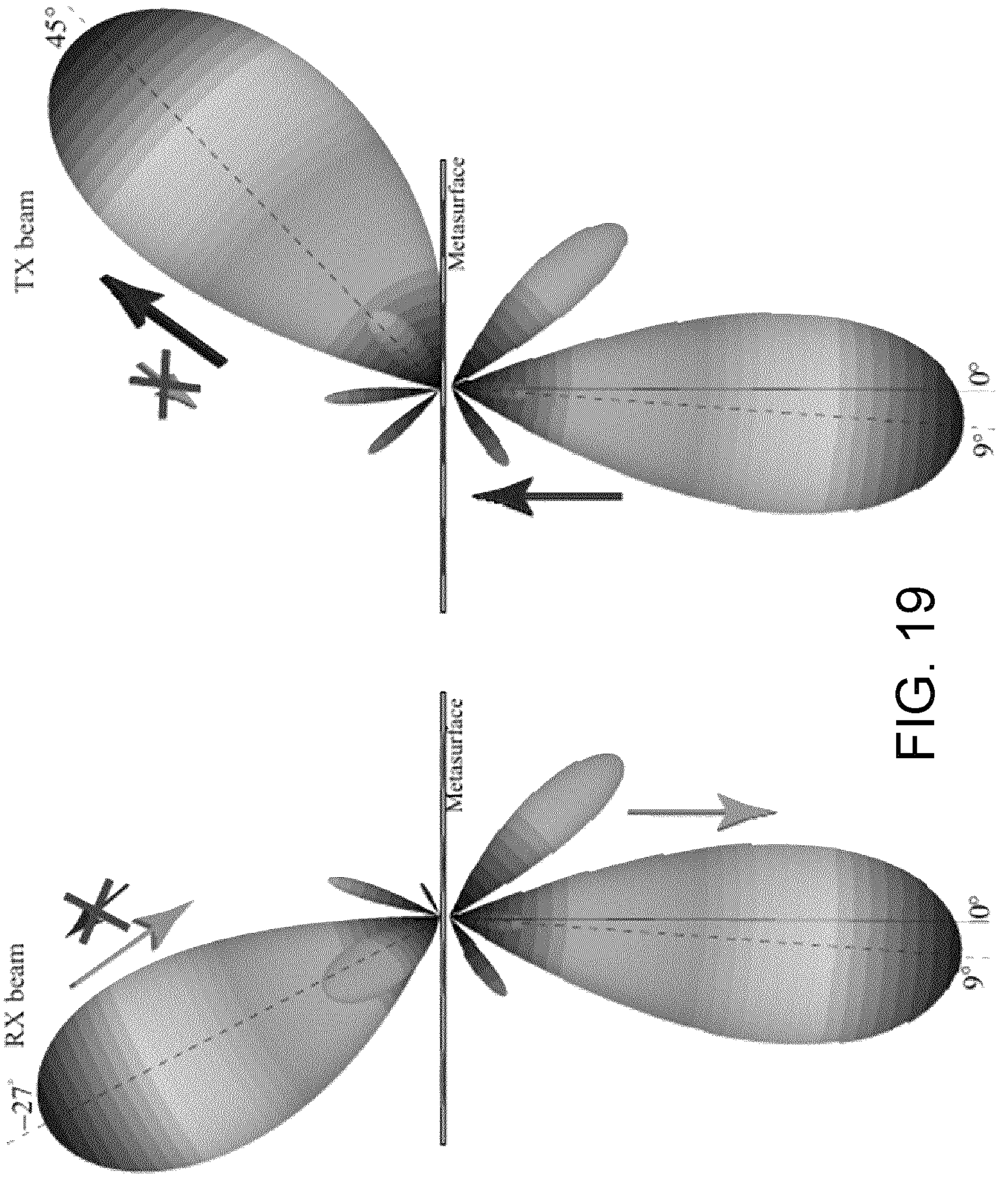
FIG. 19 provides full-wave simulation results.
Figure 20:
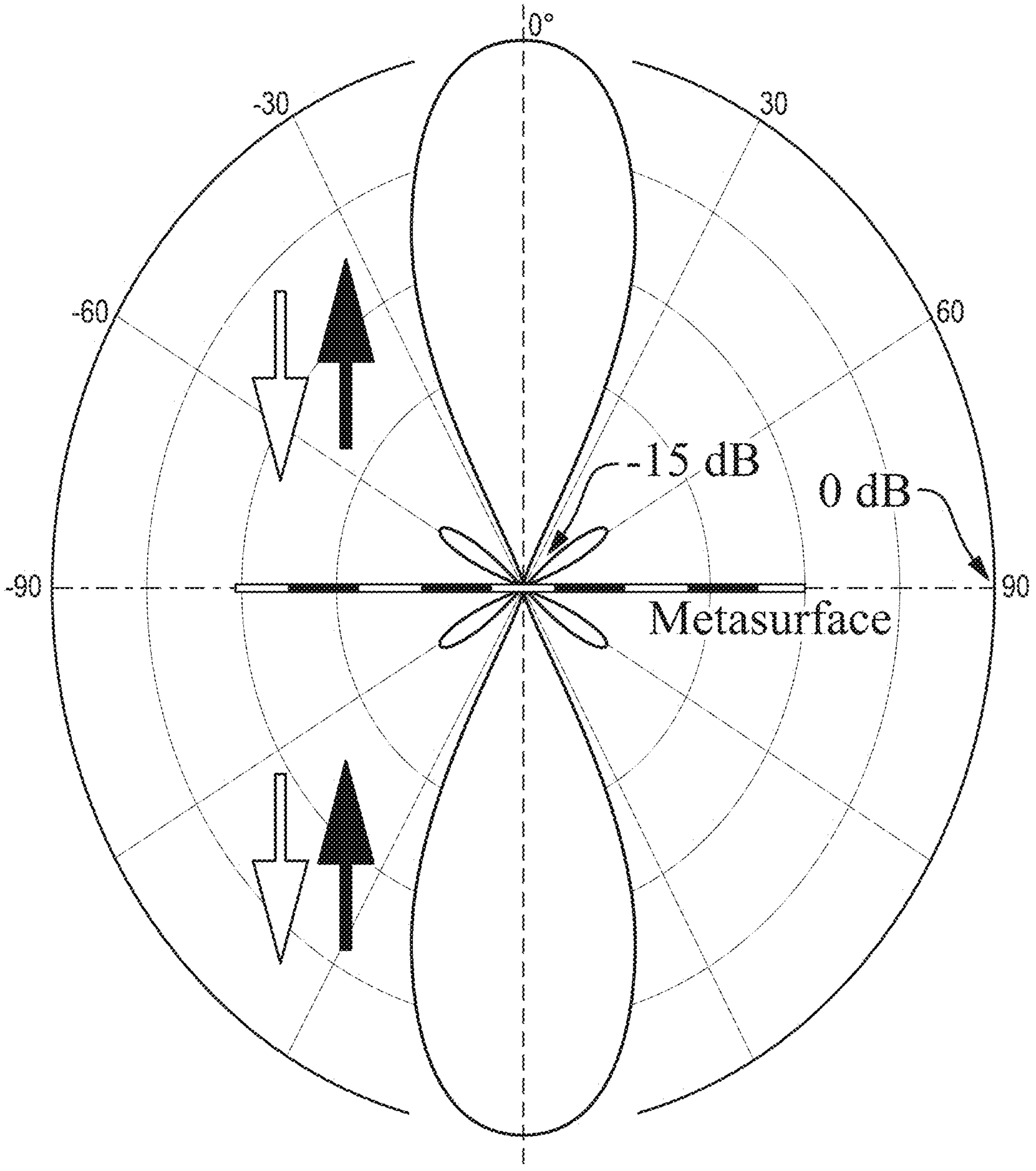
FIG. 20 provides full-wave simulation results.
Figure 21:
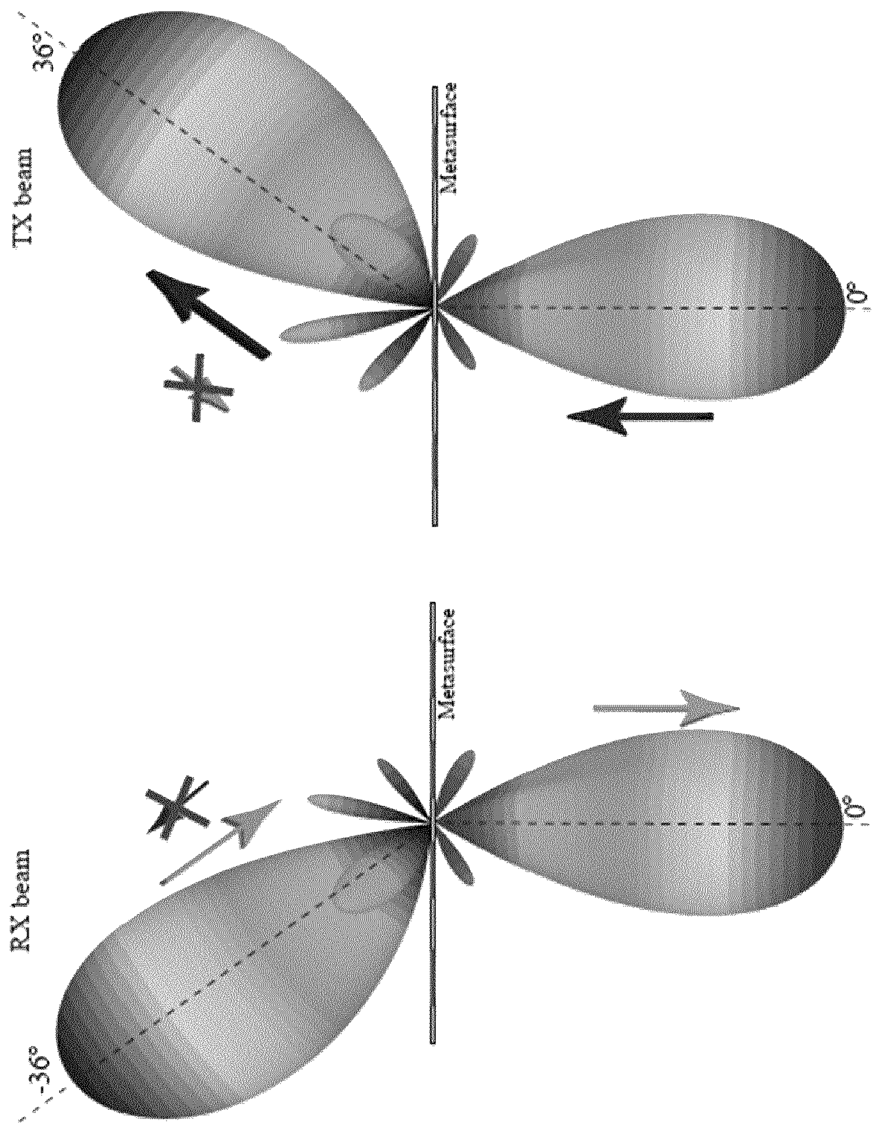
FIG. 21 provides full-wave simulation results.
Figure 22:
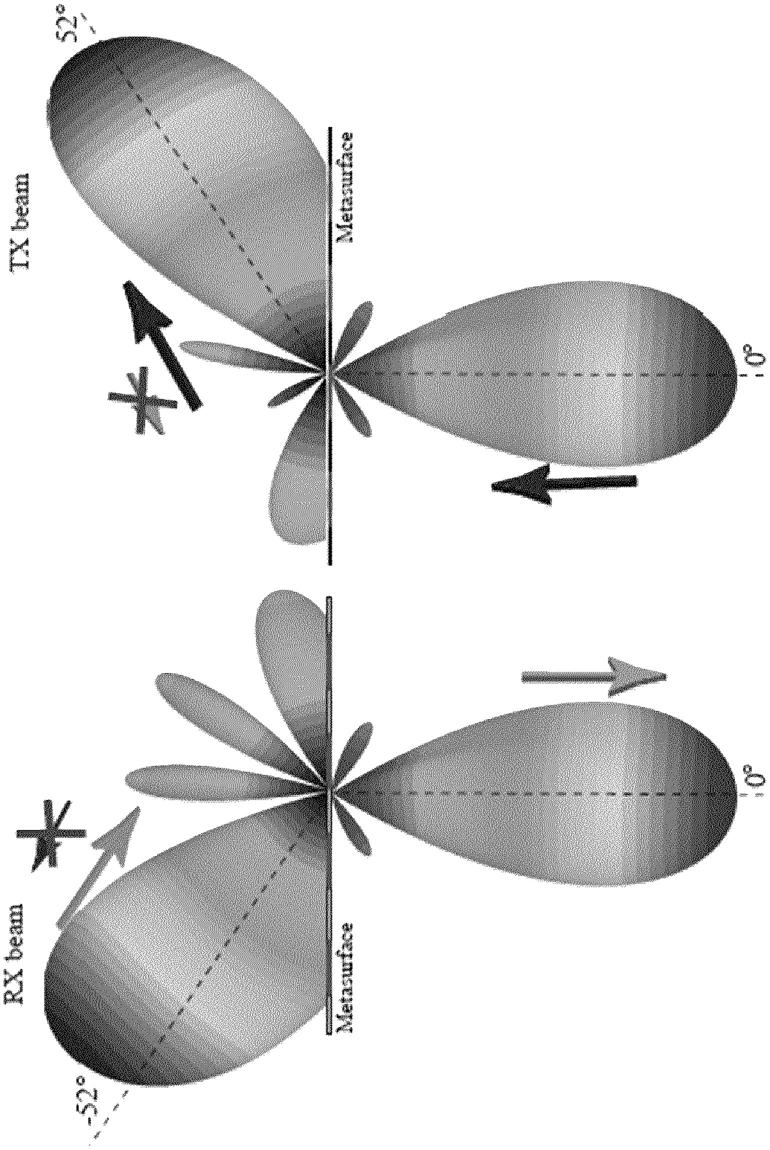
FIG. 22 provides full-wave simulation results.
Figure 23:
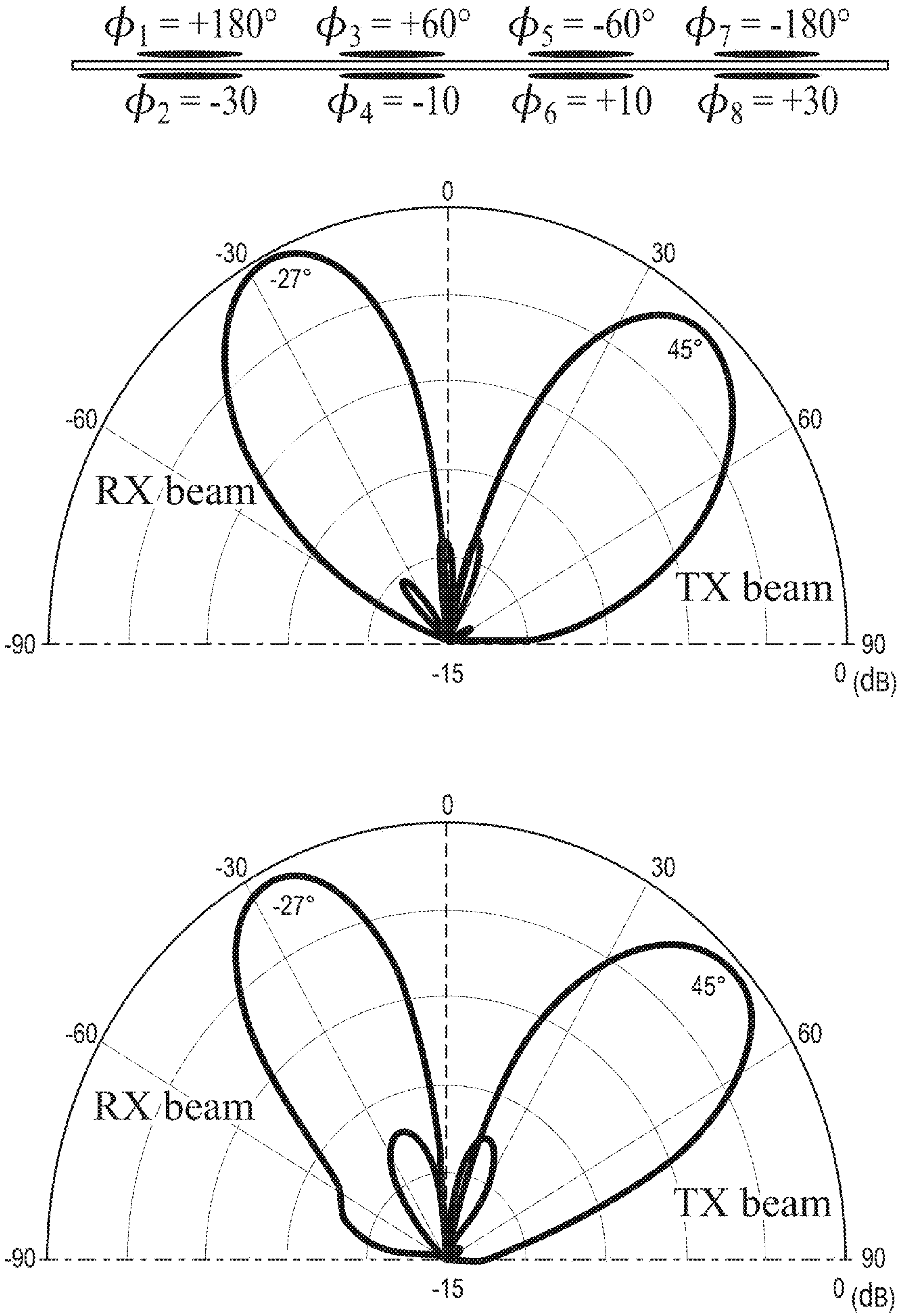
FIG. 23 provides full-wave simulation and experimental results.
Figure 24:
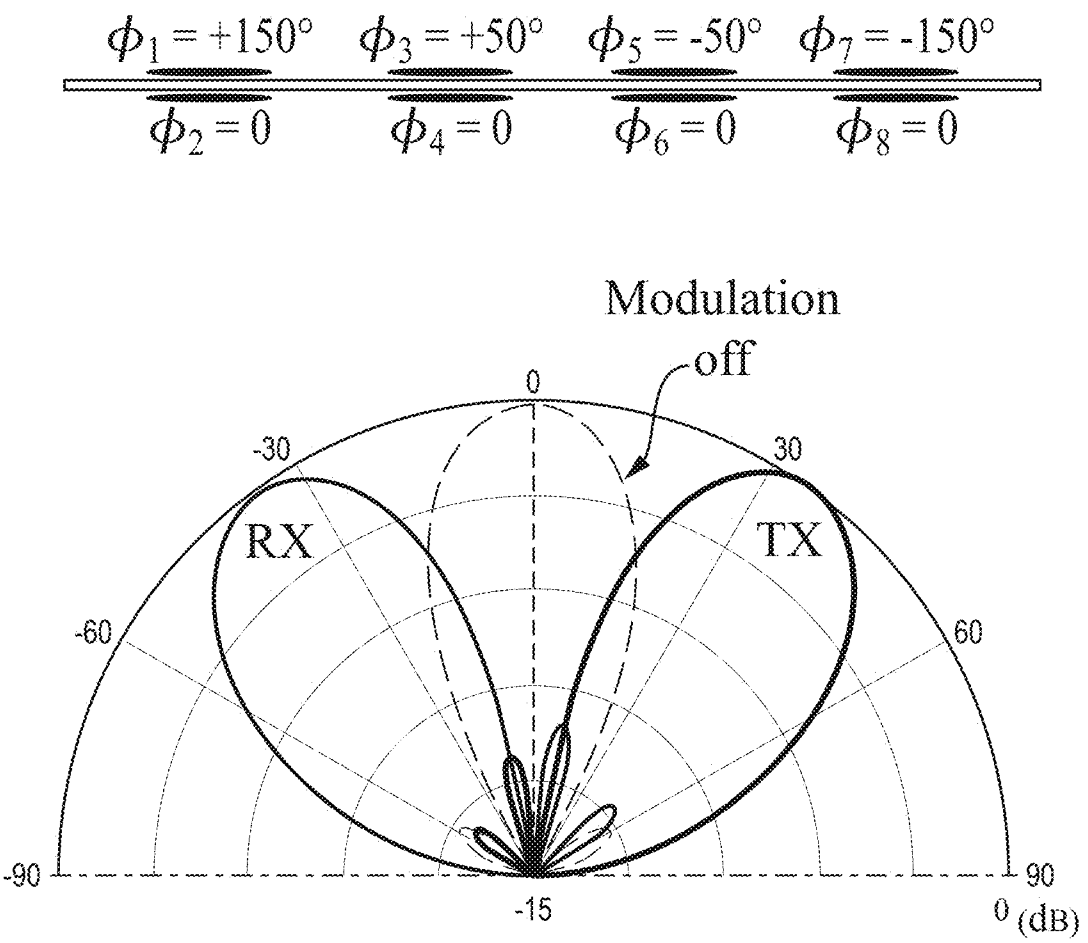
FIG. 24 provides full-wave simulation results.
Figure 25:
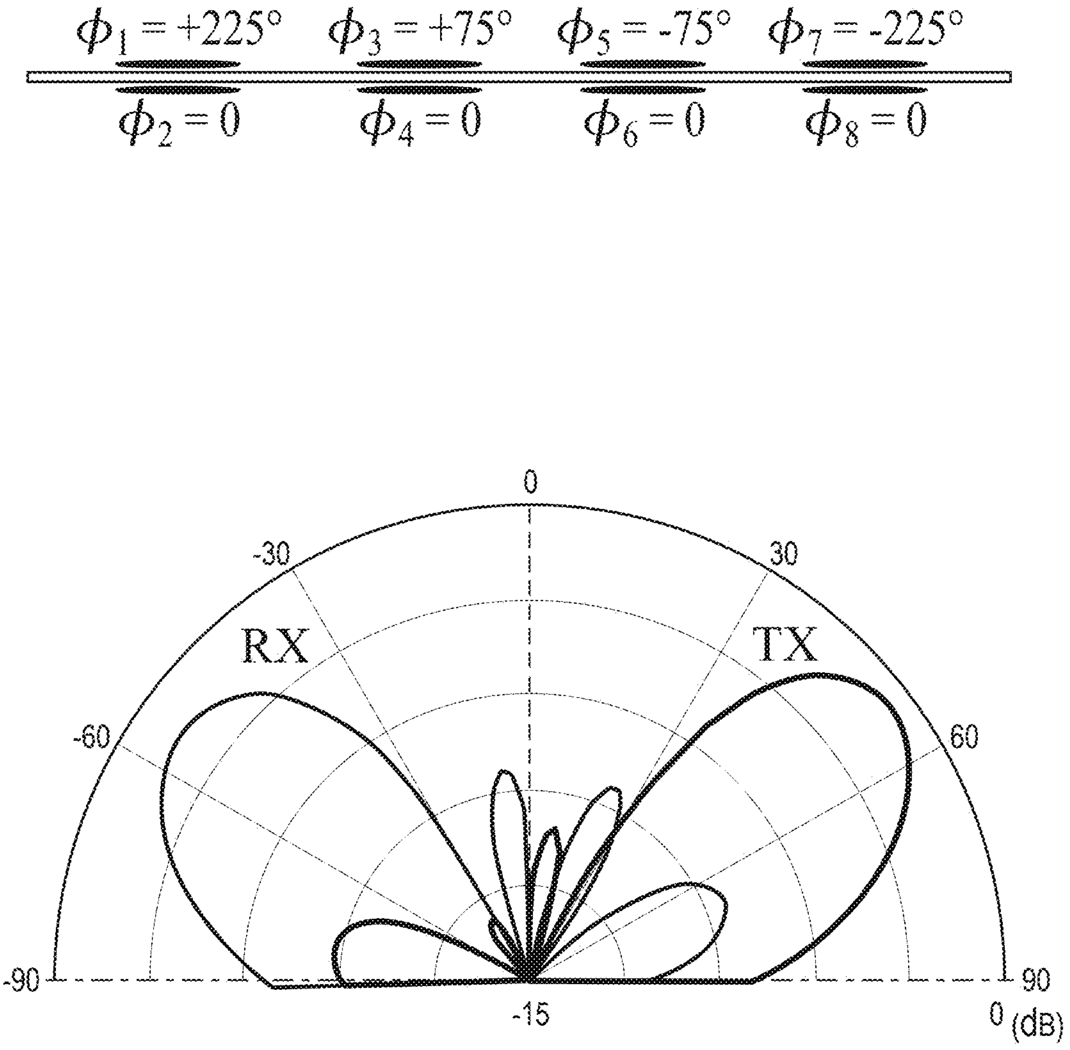
FIG. 25 provides full-wave simulation results.
Figure 26:
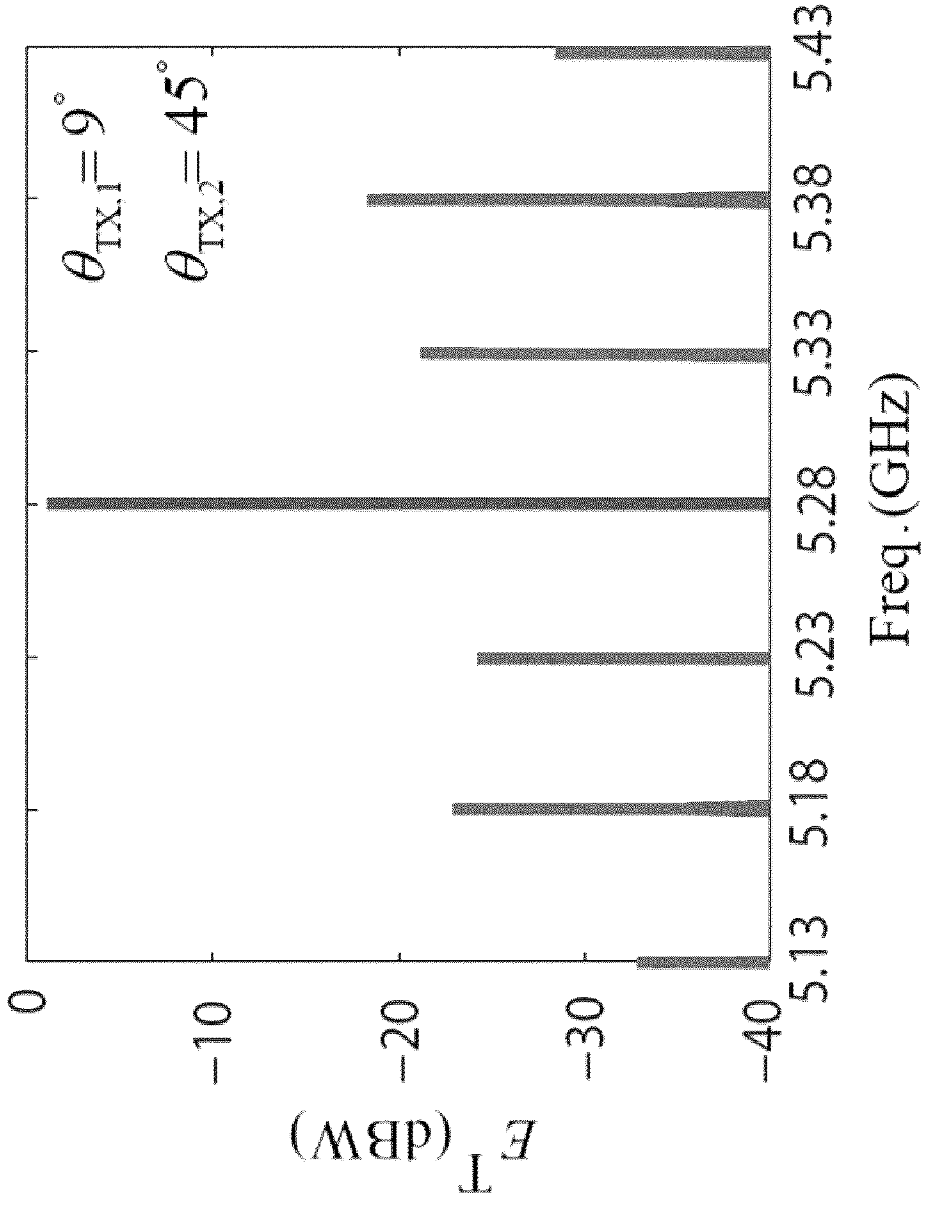
FIG. 26 provides experimental results.
Figure 27:
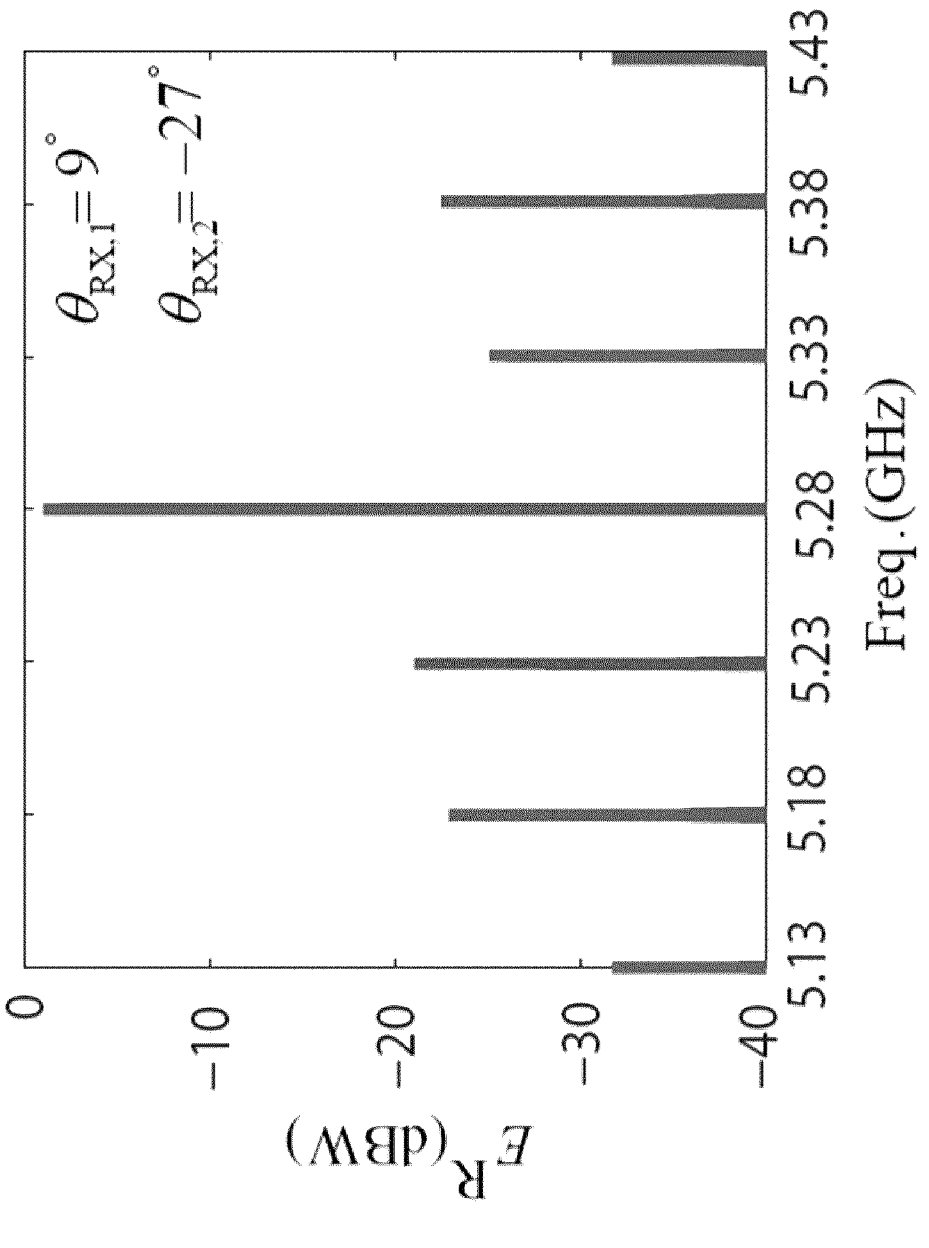
FIG. 27 provides experimental results.

FIG. 18 provides operation principle of the nonreciprocal phase shift meta-atoms.

FIGS. 19-27 plot the full-wave simulation and experimental results for the nonreciprocal angle-asymmetric transmission and reception radiation patterns of the nonreciprocal radiation beam metasurface. In this experimental embodiment, the experimental isolation between the transmission and reception radiation patters at specified transmission radiation angle ($\theta_{TX}$=45) is about 15.8 dB, and the isolation at specified reception radiation angle ($\theta_{RX}$=−27) is about 10.4 dB. To achieve higher isolation levels, one may change the modulation parameters or use a more directive metasurface by increasing the number of twin meta-atoms. Table 1 provides a summary of the disclosed nonreciprocal-beam steerable metasurface performance.

TABLE 1

| | |
|---|---|
| Operation frequency | 5.28 GHz |
| Modulation frequency | 0.05 GHz |
| Transmission angle ($\theta_{TX}$) | 45° |
| Reception angle ($\theta_{RX}$) | −27° |
| Transmission isolation | 15.8 dB |
| Reception isolation | 10.4 dB |

Although the invention has been described with reference to certain specific embodiments, various modifications thereof will be apparent to those skilled in the art without departing from the spirit and scope of the invention as outlined in the claims appended hereto.

The invention claimed is:

1. A metasurface for beam steering comprising:

two dielectric layers;

a conductor layer interposed between the two dielectric layers; and at least one meta-atom electrically connected to each of the two dielectric layers, the at least one meta-atom comprising at least one non-reciprocal tunable phase shifter and at least one antenna element, such that wherein when an incident electromagnetic signal wave having a given frequency is received at the metasurface at an angle of reception, the metasurface transmits emits a transmitted wave having an identical frequency to the given frequency of the incident wave and having an angle of transmission different from the angle of reception, wherein the at least one meta-atom is biasable with a modulation signal configured to have the angle of transmission different from the angle of reception.

2. The metasurface of claim 1, wherein the at least one antenna element comprises at least one patch radiator.

3. The metasurface of claim 1, wherein a DC and RF biasing feed is embedded inside the conductor layer.

4. The metasurface of claim 1, wherein the at least one meta-atom is biased with a modulation signal is configured to control the angle of transmission and/or the angle of reception at least one property of the transmitted wave.

5. The metasurface of claim 4, further comprising a surrounding circuit in electrical connection with the at least one meta-atom.

6. The metasurface of claim 5, wherein the surrounding circuit comprises at least one 180° phase shifter, at least one varactor diode, at least one choke inductance, and at least one decoupling capacitance.

7. The metasurface of claim 6, wherein the at least one choke inductance and at least one decoupling capacitance prevent leakage of the incident electromagnetic wave signal and decouple the modulation signals at each of the two dielectric layers of the metasurface.

8. A system comprising the metasurface of claim 1 and a signal generator for generating the modulation signal.

9. The system of claim 8, wherein the modulation signal is configured to control the angle of transmission and/or the angle of reception.

10. The system of claim 8, wherein the at least one property includes at least one of the angle of transmission for the emitted wave and the angle of reception for the incident wave.

11. A metasurface system for beam steering comprising:

two dielectric layers;

a conductor layer interposed between the two dielectric layers; and an array of meta-atoms electrically connected to each of the two dielectric layers, each one of the array of meta-atoms comprising at least one non-reciprocal tunable phase shifter and at least one antenna element, such that wherein when an incident electromagnetic signal wave having a given frequency is received at the metasurface system at an angle of reception, the metasurface system transmits emits a transmitted wave having an identical frequency to the given frequency of the incident wave and having an angle of transmission different from the angle of reception, wherein the each one of the array of meta-atoms is biasable with a modulation configured to have the angle of transmission different from the angle of reception.

12. The metasurface system of claim 11, wherein the at least one antenna element comprises at least one patch radiator.

13. The metasurface system of claim 11, wherein a DC and RF biasing feed is embedded inside the conductor layer.

14. The metasurface system of claim 11, wherein the at least one meta-atom is biased with a modulation signal is configured to control the angle of transmission and/or the angle of reception at least one property of the transmitted wave.

15. The metasurface system of claim 14, further comprising a surrounding circuit in electrical connection with the array of meta-atoms.

16. The metasurface system of claim 15, wherein the surrounding circuit comprises at least one 180° phase shifter, at least one varactor diode, at least one choke inductance, and at least one decoupling capacitance.

17. The metasurface system of claim 16, wherein the at least one choke inductance and at least one decoupling capacitance prevent leakage of the incident electromagnetic wave signal and decouple the modulation signals at each of the two dielectric layers of the metasurface system.

18. A method of beam steering using a metasurface, the metasurface comprising two dielectric layers, a conductor layer interposed between the two dielectric layers, and at least one meta-atom electrically connected to each of the two dielectric layers, the method comprising:

biasing the at least one meta-atom with a time-varying modulation signal; and the time-varying modulation signal undergoing at least one set of gradient phase shifts;

the time-varying modulation signal then biasing at least one varactor to create causing a non-reciprocal phase shift of an incident wave having a given frequency and an angle of reception, thereby causing transmission of a wave having an identical frequency to the given frequency of the incident wave and having an angle of transmission different from the angle of reception.

* * * * *